United States Patent [19]

Kumagai et al.

[11] Patent Number: 5,204,300
[45] Date of Patent: Apr. 20, 1993

[54] METHODS OF SEEDING SINTERED OBJECTS

[75] Inventors: Masato Kumagai, Chiba, Japan; Gary Messing, State College, Pa.

[73] Assignee: Kawasaki Steel Corporation, Japan

[21] Appl. No.: 366,260

[22] Filed: Jun. 12, 1989

Related U.S. Application Data

[63] Continuation of Ser. No. 178,760, Apr. 4, 1988, abandoned, which is a continuation of Ser. No. 754,818, Jul. 12, 1985, abandoned.

[30] Foreign Application Priority Data

Jul. 18, 1984 [JP] Japan .................. 59-148877

[51] Int. Cl.$^5$ ............................................ C04B 35/10
[52] U.S. Cl. ........................................ 501/127; 501/12; 501/153; 501/134; 423/610; 423/625; 423/626
[58] Field of Search .................. 501/127, 153, 134, 12; 423/610, 625, 626

[56] References Cited

U.S. PATENT DOCUMENTS

| | | | |
|---|---|---|---|
| H189 | 1/1987 | Bauer ........................ | 423/626 X |
| 2,944,914 | 7/1960 | Bugosh ...................... | 501/127 X |
| 2,982,614 | 5/1961 | Csordas et al. ............ | 501/127 X |
| 3,141,786 | 7/1964 | Bugosh ...................... | 501/153 X |
| 3,377,176 | 4/1968 | Wolhodoff .................. | 501/153 O |
| 3,862,297 | 1/1975 | Claridge et al. ........... | 423/615 OR |
| 3,945,945 | 3/1976 | Kiovsky et al. ............ | 423/628 X |
| 4,019,914 | 4/1977 | Esper et al. ................ | 501/127 O |
| 4,101,615 | 7/1978 | Horikiri et al. ........... | 501/128 X |
| 4,166,147 | 8/1979 | Lang et al. ................. | 501/134 X |
| 4,196,769 | 4/1980 | Feagin ........................ | 501/128 X |
| 4,505,886 | 3/1985 | Cody et al. ................. | 423/615 X |
| 4,543,107 | 9/1985 | Rue ............................. | 51/309 OR |
| 4,555,394 | 11/1985 | Asaoka et al. ............. | 423/626 OR |
| 4,562,059 | 12/1985 | Asaoka et al. ............. | 423/626 OR |
| 4,615,875 | 10/1986 | Gonczy et al. ............. | 423/626 OR |
| 4,623,364 | 11/1986 | Lotteringer et al. ...... | 51/309 OR |
| 4,829,031 | 5/1989 | Roy et al. ................... | 501/134 |
| 4,835,124 | 5/1989 | Pearson ...................... | 501/127 |

FOREIGN PATENT DOCUMENTS

| | | |
|---|---|---|
| 0168606 | 1/1986 | European Pat. Off. . |
| 0065392 | 6/1974 | Japan ............ 501/153 |
| 0088075 | 6/1982 | Japan ............ 501/153 |

OTHER PUBLICATIONS

P. A. Badkar, J. E. Bailey and H. A. Barker "Sintering Behavior of Boehmite Gel", Date Unknown, pp. 311 to 321.

F. W. Dynys and J. W. Holloran, "Alpha Alumina Formation in Alum-Derived Gamma Alumina", vol. 65, No. 9, pp. 442 to 448.

Bulent E. Yoldas, "Alumina Sol Preparation From Alkoxides", Mar. 26, 1974, pp. 289 to 290.

(List continued on next page.)

Primary Examiner—Karl Group
Attorney, Agent, or Firm—Austin R. Miller

[57] ABSTRACT

A ceramic sintered body and a method for manufacturing the same in which the body includes a first material having at least one of a precursor and a metastable material of the final sintered body and a second material morphologically related to the first material and added to the first material to affect transformation of said first material into the desired crystalline form of the ceramic sintered body, in which method transformation of a metal oxide compound from one phase to another, where the compound has a high activation energy and is confronted with a high nucleation energy barrier to the transformation, produces the body and includes the steps of making a mixture by bringing a multiplicity of particles of the compound into intimate contact with the multiplicity of nucleation particles having crystallographically related structure to act as nuclei for the transformation and sintering the resulting mixture to transform the compound from one phase to another by nucleation and growth, independently of growth of the nucleation particles.

7 Claims, 18 Drawing Sheets

OTHER PUBLICATIONS

P. F. Becher, J. H. Sommers, B. A. Bender and B. A. Mac Farlane "Ceramics Sintered Directly From Lol--Gels" 1978, pp. 79 to 86.

B. E. Yoldas, "Effect of Variations in Polymerized Oxides on Sintering and Crystalline Transformations" Oct. 5, 1981, pp. 387 to 393.

Bulent E. Yoldas, "Transparent Porous Alumina", Mar. 26, 1974 pp. 286 to 287. vol. 54, No. 3.

"Enhanced Densification of Boehmite Sol-Gels by Alpha-Alumina Seeding", Journal of American Ceramic Society, vol. 6, No. 11, Nov. 1984 pp. C230-C231.

Chemisches Zentralblatt, No. 27, Jul. 5, 1961, p. 9552, Abstract, Berlin De.

P. A. Badkar and J. E. Bailey "The Mechanism of Simultaneous Sintering and Phase Transformation In Alumina" 1976, pp. 1794 to 1806.

F. W. Dynys, M. Ljungberg and J. W. Balloran, "Microstructural Transformations in Alumina Gels", 1984, vol. 32, pp. 321 to 326.

METHODS OF SEEDING SINTERED OBJECTS

This application is a continuation of application Ser. No. 178,760, filed Apr. 4, 1988, now abandoned, which is a continuation of Ser. No. 754,818, filed Jul. 12, 1985, now abandoned.

This invention relates to dense ceramic sintered bodies having a small, homogenous grain size. In other words, this invention relates to high performance sintered ceramic bodies, such as engineering ceramics and electronic ceramics, and especially to densified sintered objects and to methods for making same.

BACKGROUND

Rapid technological advances have been made in various fields such as energy conservation, information processing and life science. In accordance with these advances, materials, especially ceramics which constitute the basis of the technology, have been required to have higher quality and performance. Need for development of materials with new and excellent properties and functions have had high priority recently.

Among the various needs, it is especially important to manufacture dense, homogeneous and fine-grain ceramics with high reliability at relatively low temperature.

Many ceramics such as $Al_2O_3$, $ZrO_2$ and $TiO_2$ exist in a variety of crystalline forms or polymorphs. Transformation of the polymorphic forms of a ceramic are classified as either displacive or reconstructive, depending on the extent of atomic reorganization necessary for the transformation. In general ceramic materials that undergo reconstructive transformation (e.g. $Al_2O_3$, $TiO_2$), transform by nucleation and growth and have high activation energies. Most of the activation energy of a transformation is utilized in the nucleation process. Thus, elevated temperatures are required to overcome the high activation energy barrier for nucleation.

For ceramic fabrication it is necessary to transform the ceramic powder to the stable form before consolidation, because low densities are usually obtained on sintering if the ceramic powder undergoes transformation during heating. However, because of the elevated temperatures imposed by the high activation energy, the ceramic powder becomes coarsened, aggregated and generally unsuitable for ceramic processing and fabrication without additional intermediate processing, prior to the ceramic processing and fabrication.

Many technological as well as scientific advances have been achieved in the ceramic field based on need. As a representative example, a process involving low temperature preparation of non-agglomerated mono-sized powders with high purity, consolidation of the powders using a colloidal process, and sintering them at a lower temperature than usual has been extensively studied.

Such a process would be very attractive not only because of the possibility of circumventing problems associated with conventional processes and their products, such as non-homogeneity, grain coarsening and low reliability, but also because of energy conservation. One of the problems of such a process, however, is that low temperature preparation of ceramic powders usually results in the formation of powders in metastable phases different from the phases of final sintered bodies. For example, amorphous or crystalline aluminum hydroxides are commonly obtained by low temperature synthesis of aluminum oxide and alpha alumina (alpha alumina is the thermodynamically stable phase of aluminum oxide in the usual atmosphere but whose synthesis at low temperature has not been reported).

Low temperature synthesis of $TiO_2$ and $2RO_2$ usually leads to the formation of amorphous or metastable crystalline phases.

Although it is feasible to convert powders in metastable phases into stable phases by appropriate heat treatment, problems are encountered such as high energy consumption, complexity of the process and property degradation of the powders (extraordinary grain growth, aggregation, etc.) during the treatment.

On the other hand, when powders in the metastable phases are used as starting materials for sintered ceramics without treatment, deleterious microstructural changes are commonly observed in the sintered bodies during transformation, typically from a metastable to a stable phase.

The microstructural change is usually accompanied by rapid grain growth and formation of closed pores inside the grains. As a result, this transformation results in non-homogeneous sintered bodies with entrapped pores and coarse grains. A higher temperature is also required to obtain a dense, sintered body. These disadvantages are further aggravated by presence of adsorbed water and gases, which tend to leave many closed pores in the sintered bodies during the densification process when fine powders prepared at low temperature are used as starting materials.

Mainly because of these problems many processes using fine powders prepared at low temperatures have not achieved what is believed to be their potential, namely both excellent performance and high reliability in a wide range of ceramic materials.

SUMMARY OF THE INVENTION

In one of its aspects this invention broadly encompasses a method for reconstructive transformation of a metal oxide compound from one crystalline form to another, where the compound has a high activiation energy and there is a high activation nucleation energy barrier to such transformation, which method includes nucleating the reconstructive transformation by contacting a multiplicity of particles of the compound with a multiplicity of nucleation particles having compatible crystal structure to act as nuclei for the transformation and sintering the resulting mixture at a temperature and for a time to effect such transformation of said metal oxide compound from one crystalline form to another by nucleation and growth, independently of growth of the nucleation particles.

In another of its aspects this invention broadly encompasses a ceramic sintered body made from a constituent material including a precursor and a metastable material forming a part of the ceramic sintered body, and another material derived from the constituent material and added to the constituent material on at least a 0.1% particle number basis.

Another aspect of the invention is in controlling the theta to alpha polymorphic transformation, for example of $Al_2O_3$, by nucleating or seeding the transformation with alpha particles. Nucleating or seeding means the intentional introduction of particles that act as nuclei for the transformation and that do not rely upon their growth during heating. This provides a unique method for controlling microstructural development during polymorphic transformation and thus a new method for ceramic processing control. The invention further encompasses seeding a boehmite sol gel with alpha $Al_2O_3$ to control the boehmite to alpha $Al_2O_3$ transformation, the microstructural changes occurring during transformation and the densification of the transformation material.

DRAWINGS

Referring to the drawings.

Figure 8A:
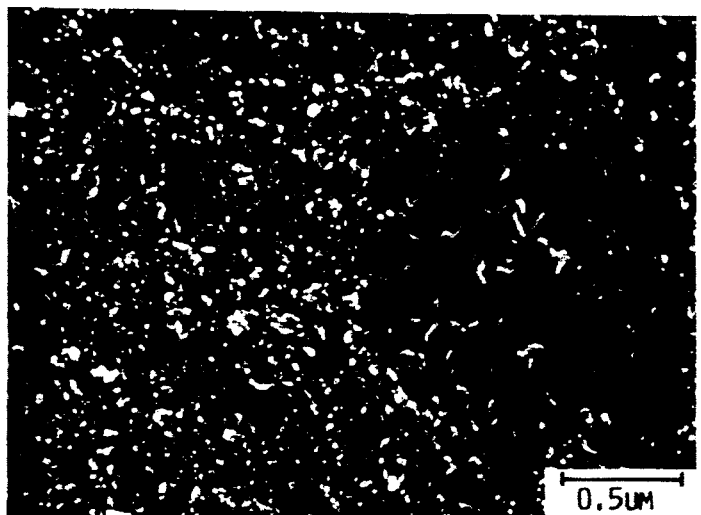
Figure 8B:
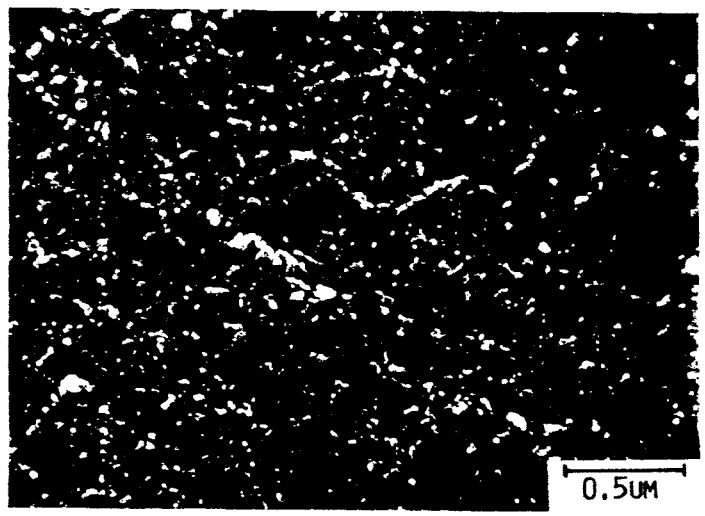
Figure 8C:
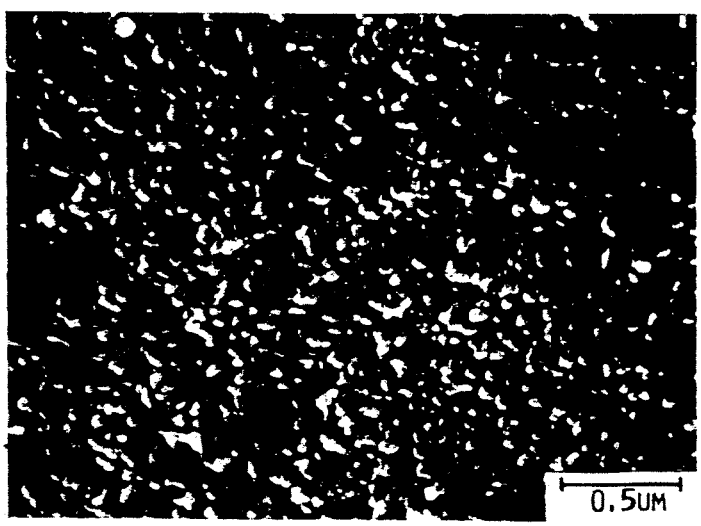

FIGS. 8a through 8c show representative microstructures of unseeded and alpha $Al_2O_3$ seeded gels at 1025° C. FIG. 8a is at 2 hours, unseeded; FIG. 8b is at 15 minutes, 0.15 wt %; FIG. 8c is at 10 minutes, 1.5 wt %.

Figure 9:
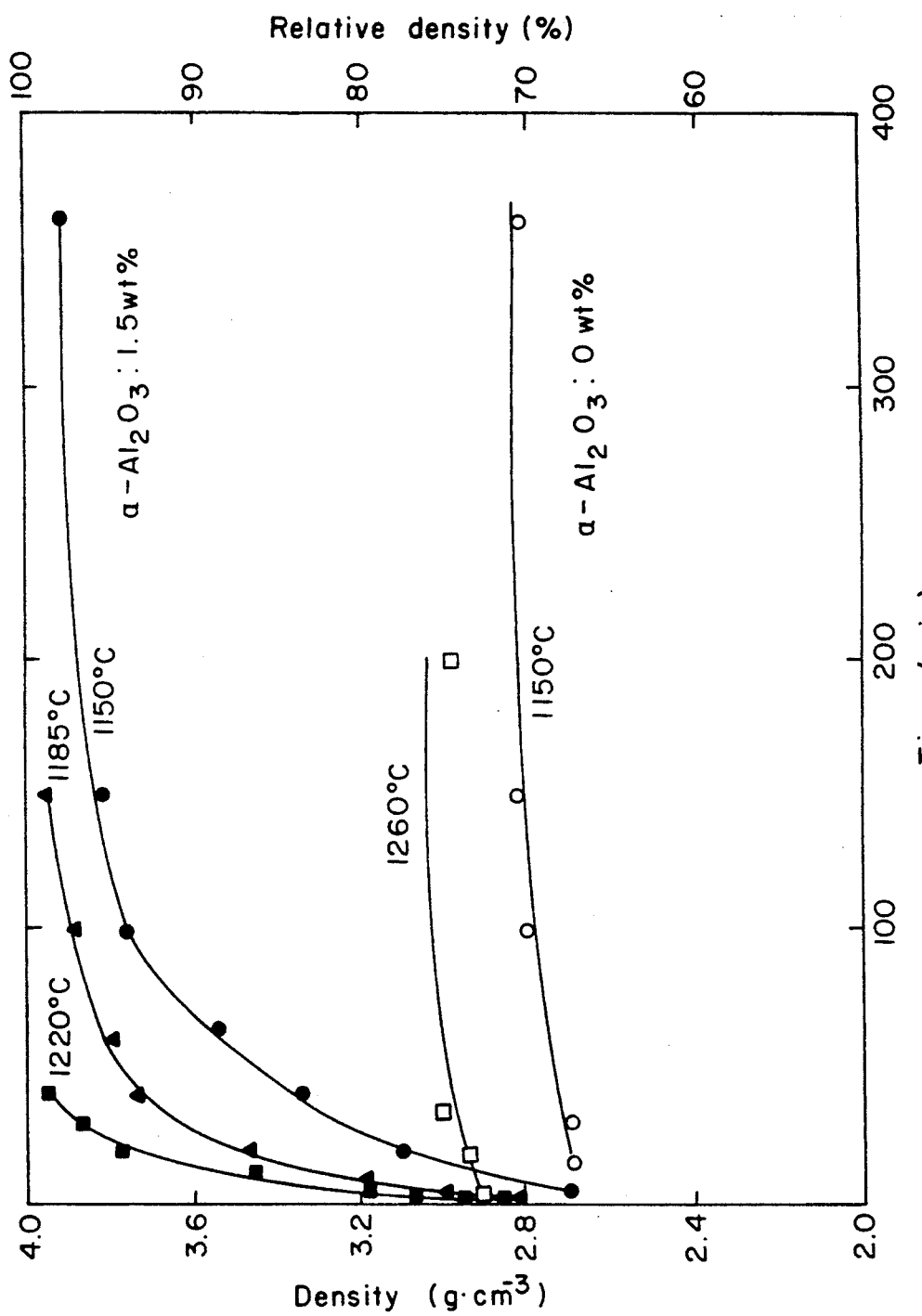

FIG. 9 shows sintering kinetics for unseeded and alpha $Al_2O_3$ seeded gels.

Figure 10A:
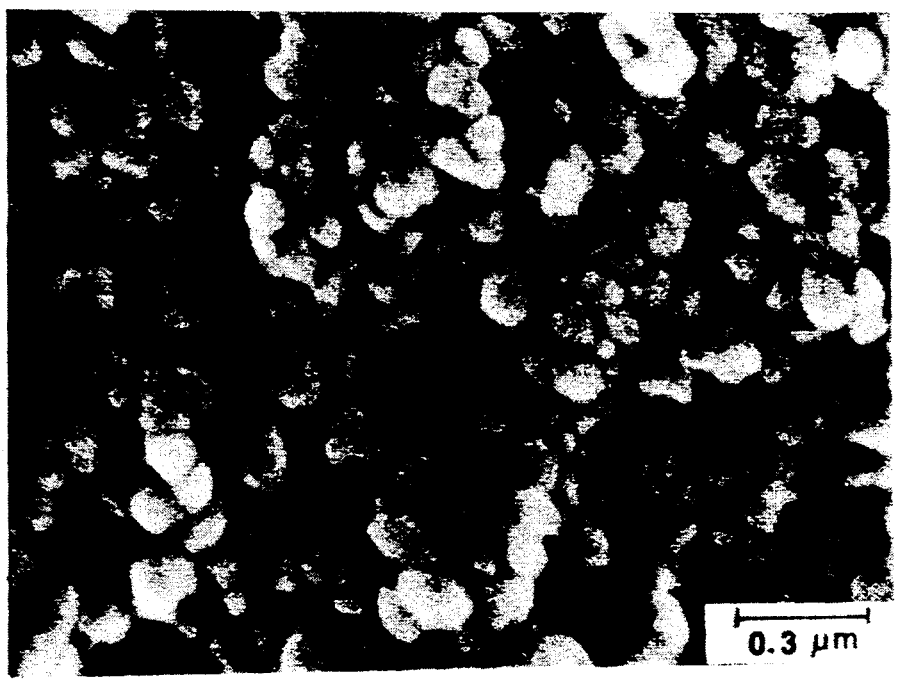
Figure 10B:
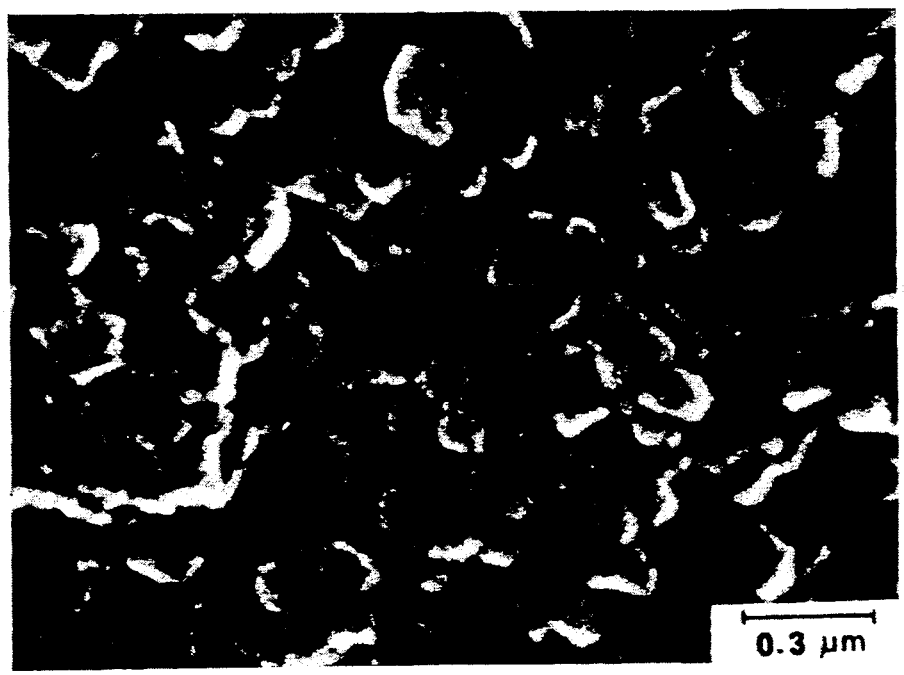
Figure 10C:
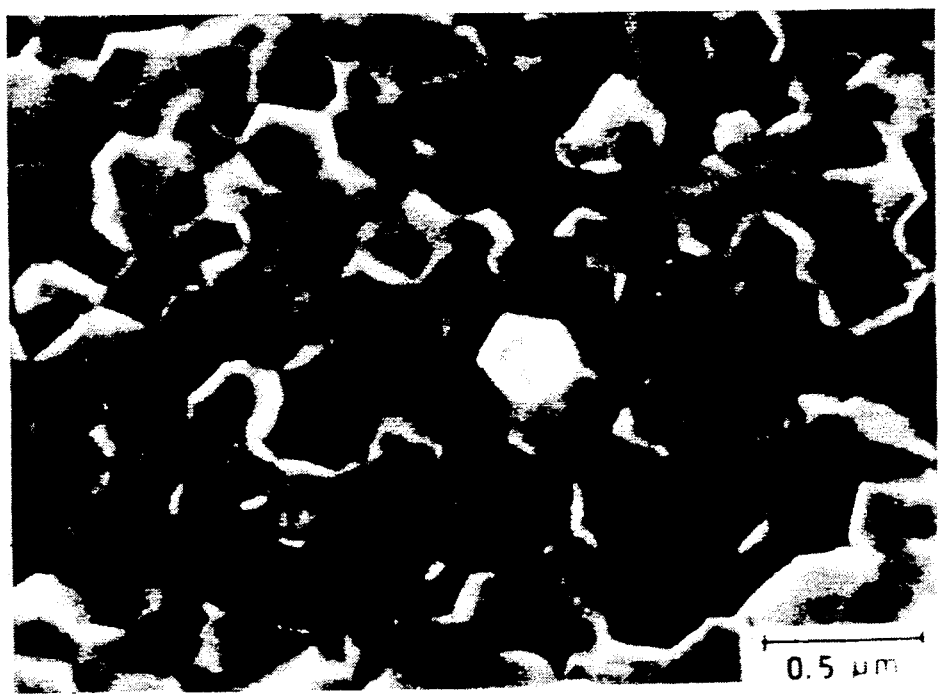
Figure 10D:
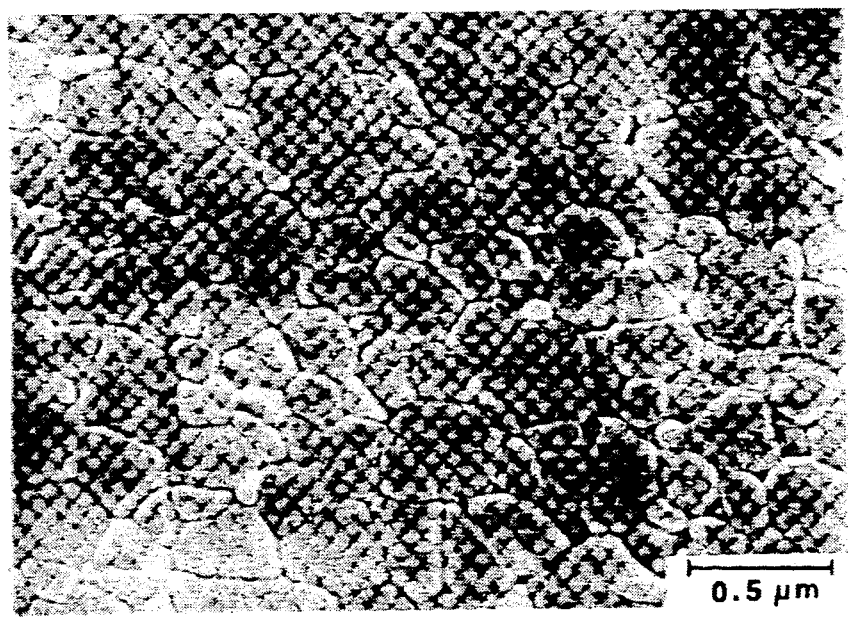

FIGS. 10a through 10d show representative microstructural development at various times at 1185° C. for the alpha $Al_2O_3$ seeded gels. FIG. 10a is at 2 minutes, FIG. 10b is at 20 minutes, FIG. 10c is at 100 minutes, FIG. 10d is at 150 minutes.

Figure 11:
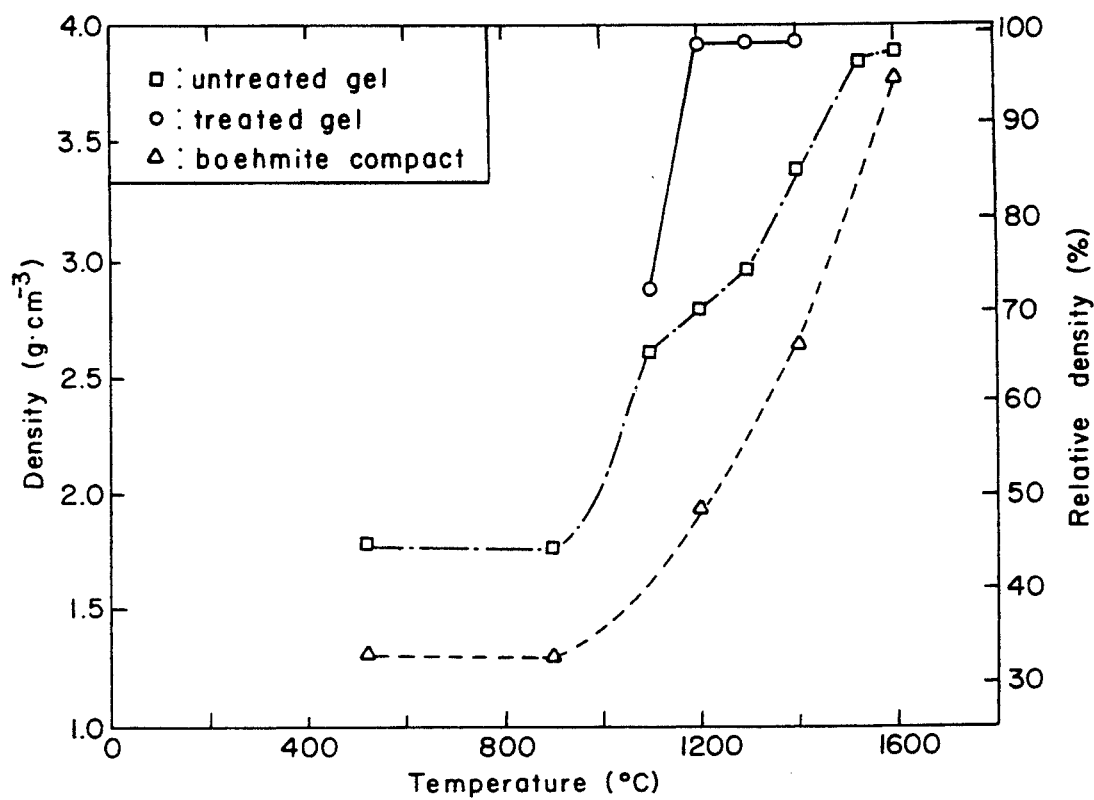

FIG. 11 shows a comparison of sintered densities of samples prepared by different processes and sintered at different temperatures.

Figure 12:
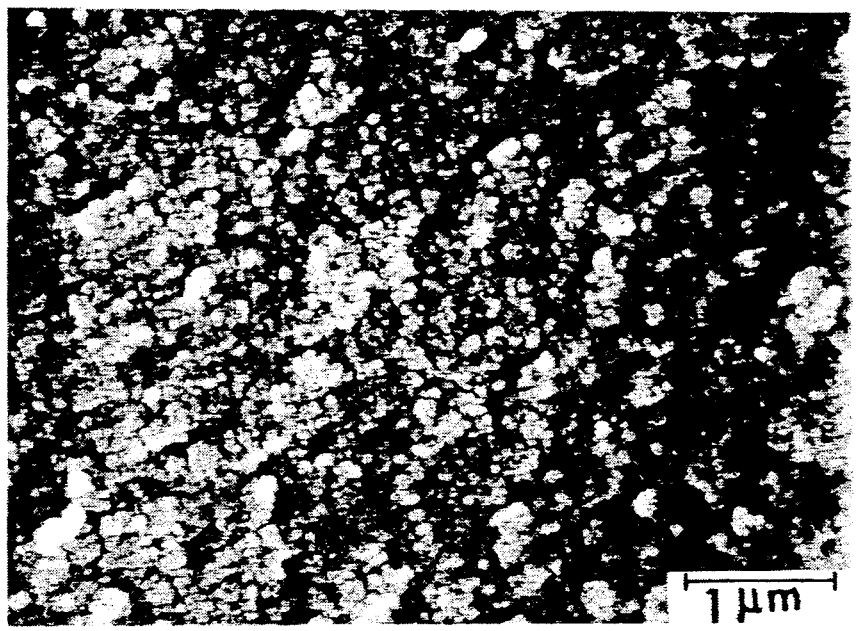

FIG. 12 shows representative microstructure of dessicated boehmite gel.

Figure 13A:
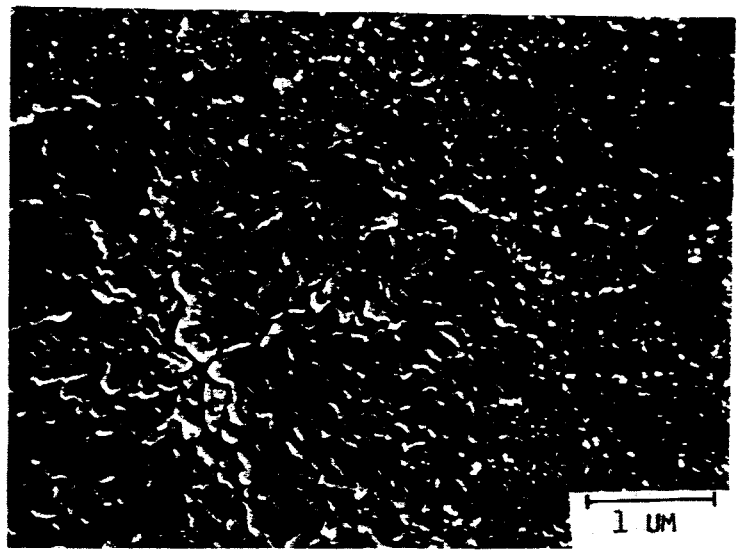
Figure 13B:
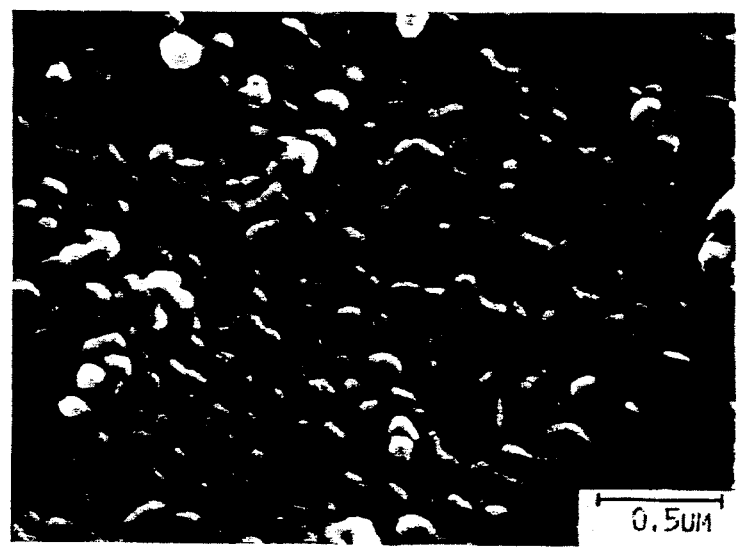
Figure 13C:
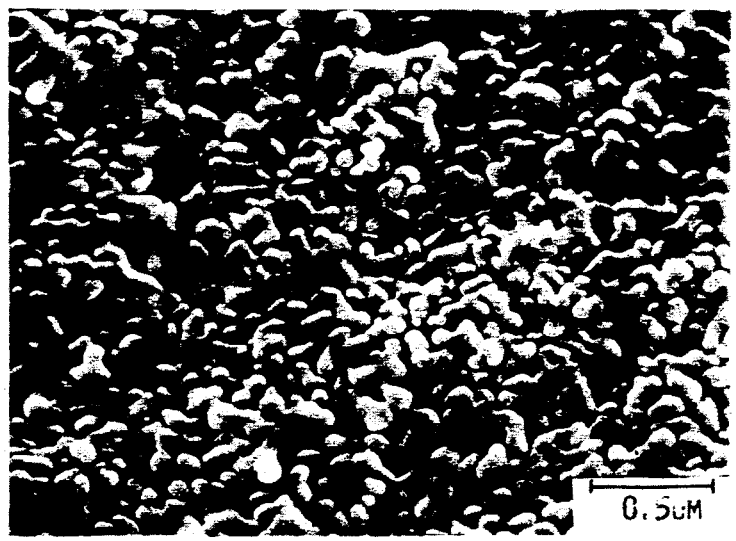

FIG. 13 shows representative surfaces of boehmite gels seeded in FIG. 13a at 0%; in FIG. 13b at 0.15%, and in FIG. 13c at 1.5 wt %, all after heating at 1050° C. for 100 minutes.

Figure 14:
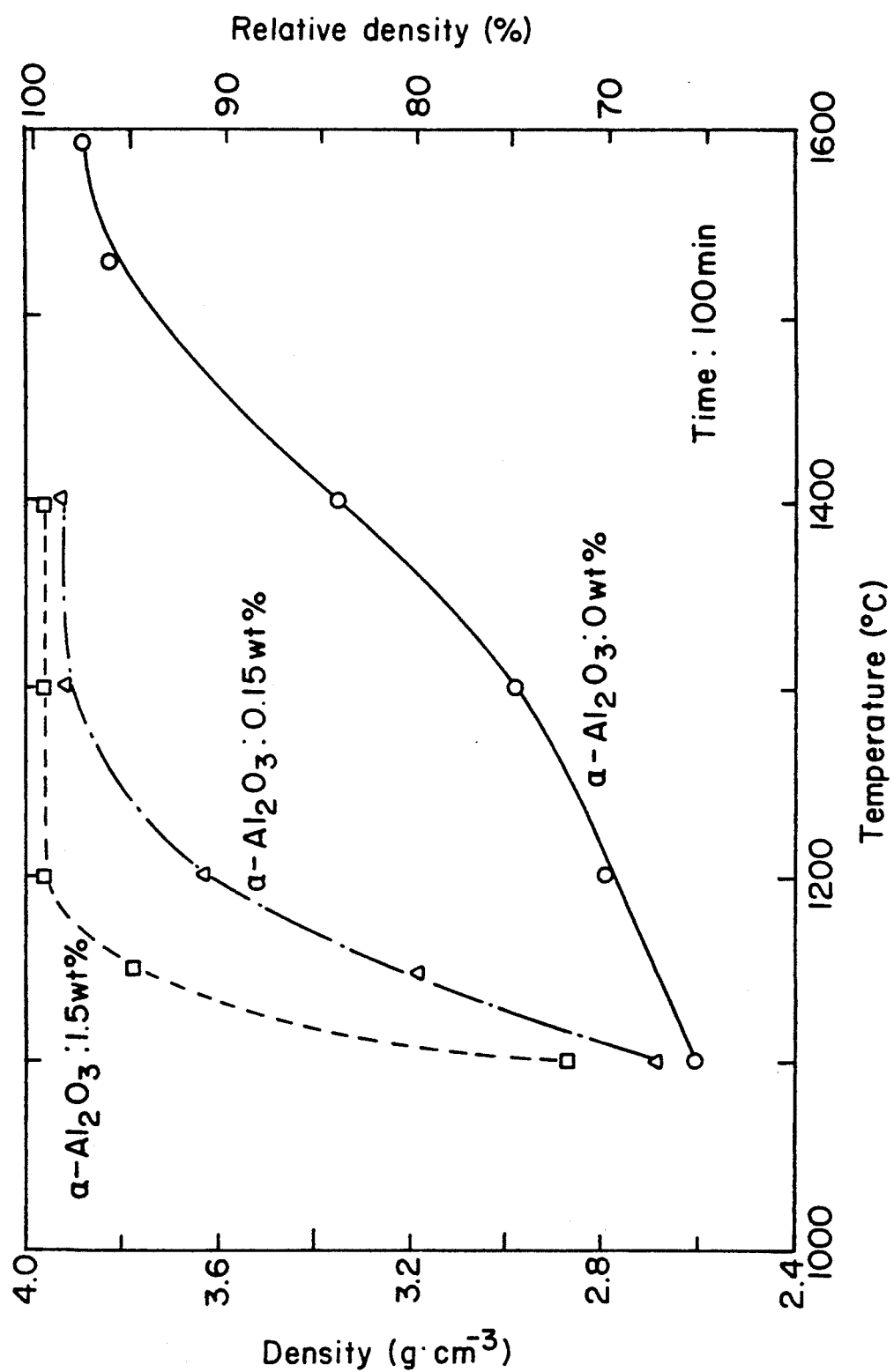

FIG. 14 shows density of seeded gels as a function of temperature when heated for 100 minutes.

Figure 15A:
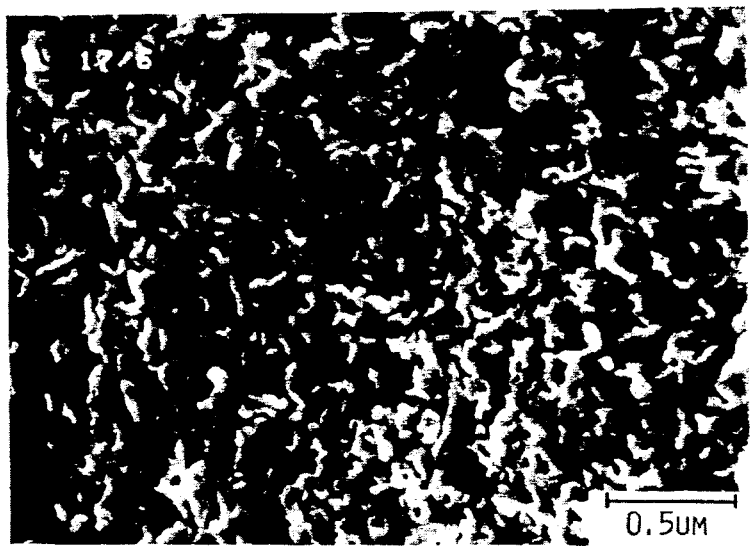
Figure 15B:
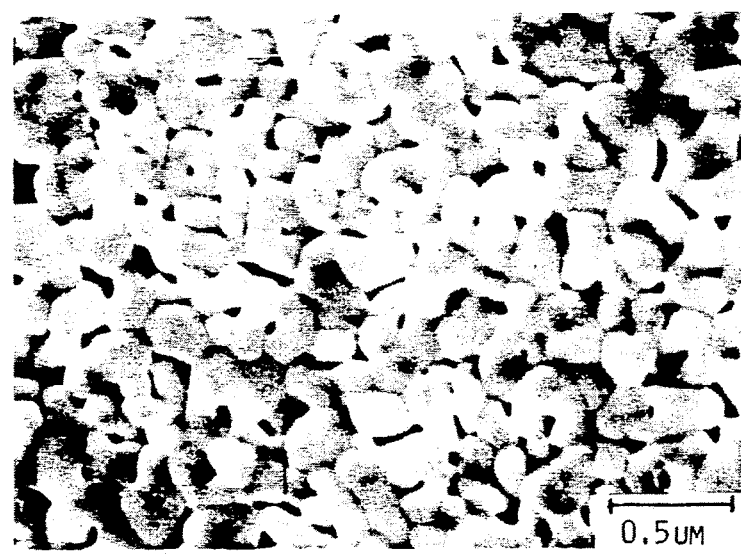
Figure 15C:
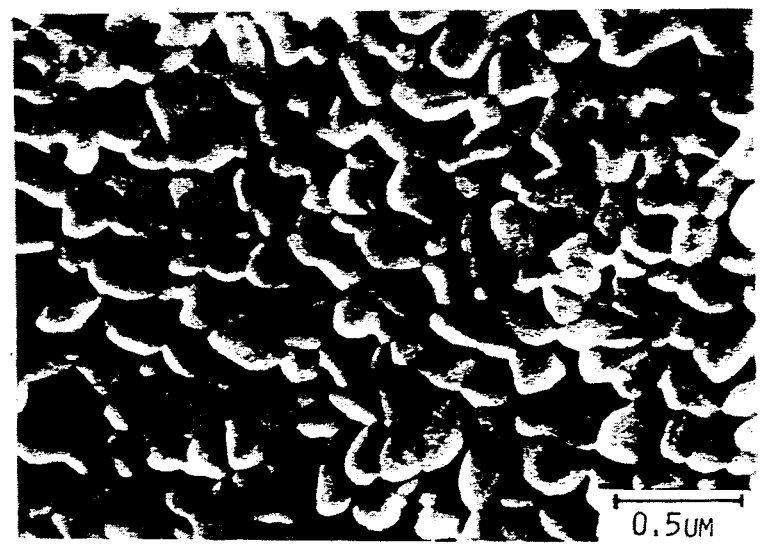

FIG. 15 shows representative fired surfaces of 0.15 and 1.5 wt % alpha alumina seeded boehmite samples after heating at 1100° C. for 100 minutes.

Figure 16A:
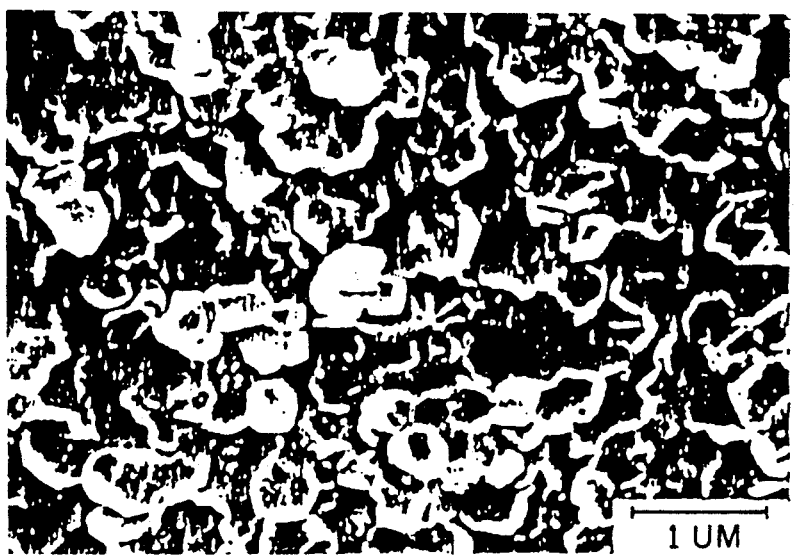
Figure 16B:

FIG. 16 shows representative polished and etched surfaces of 0.15 and 1.5 wt % alpha alumina seeded boehmite samples after heating at 1200° C. for 100 minutes.

Figure 17A:
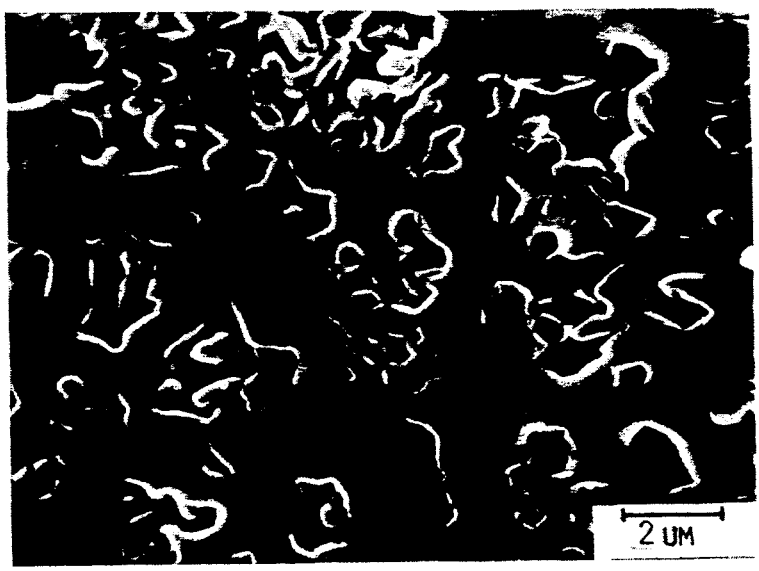
Figure 17B:
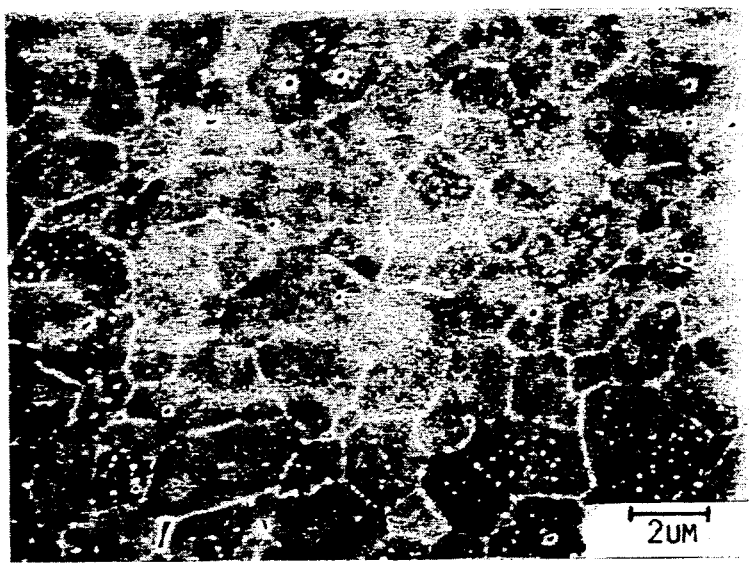
Figure 17C:
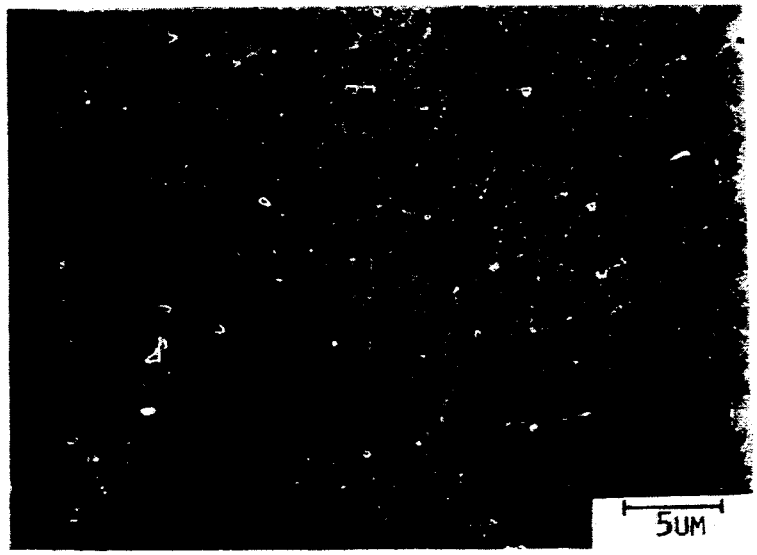

FIG. 17 shows representative polished and etched surfaces of 0.15 and 1.5 wt % alpha alumina seeded boehmite samples after heating at 1300° C. for 100 minutes in which the wide dots are remnants from the polishing process and are not related to the microstructure.

Figure 18:
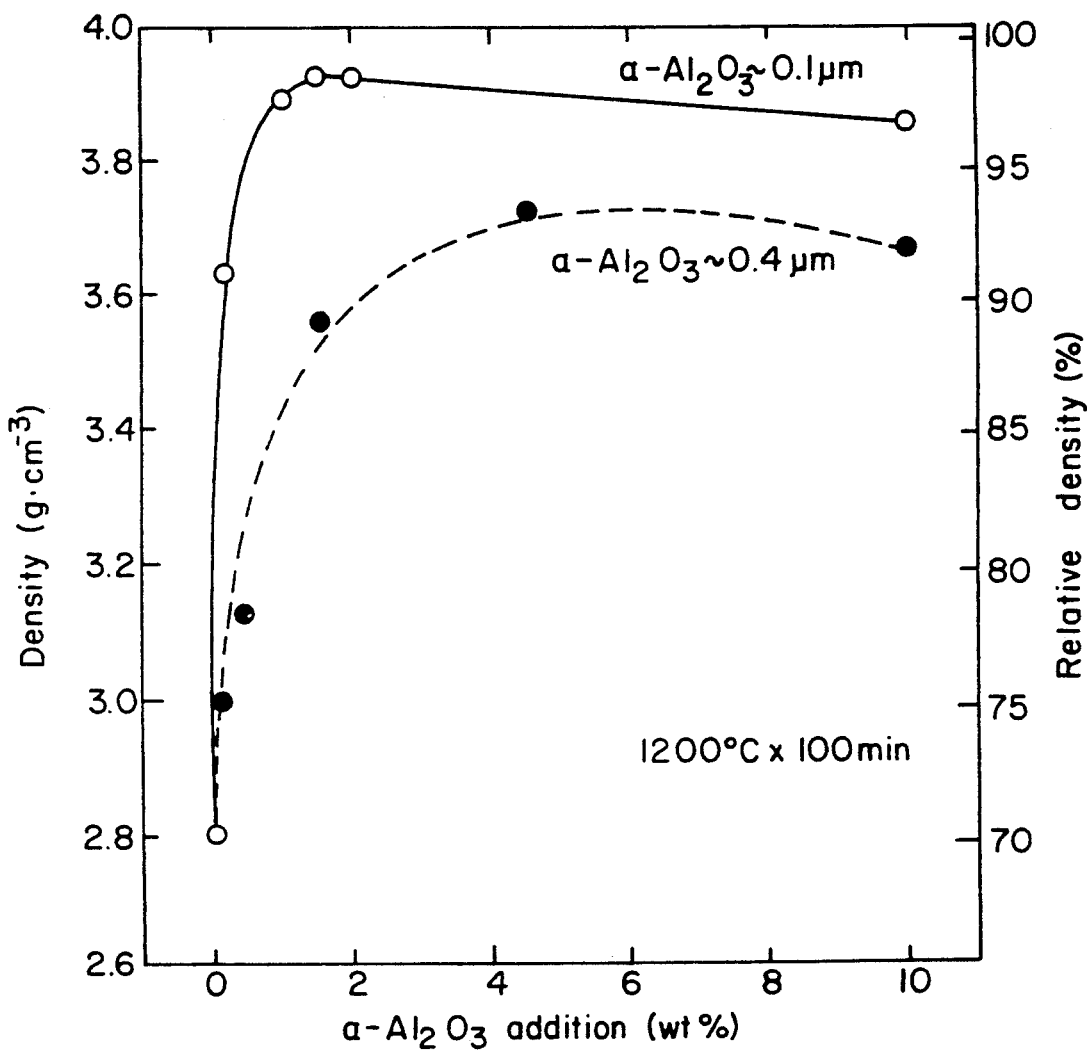

FIG. 18 shows density as a function of wt % alpha alumina seeding for two different seed sizes after heating at 1200° C. for 100 minutes.

Figure 19:
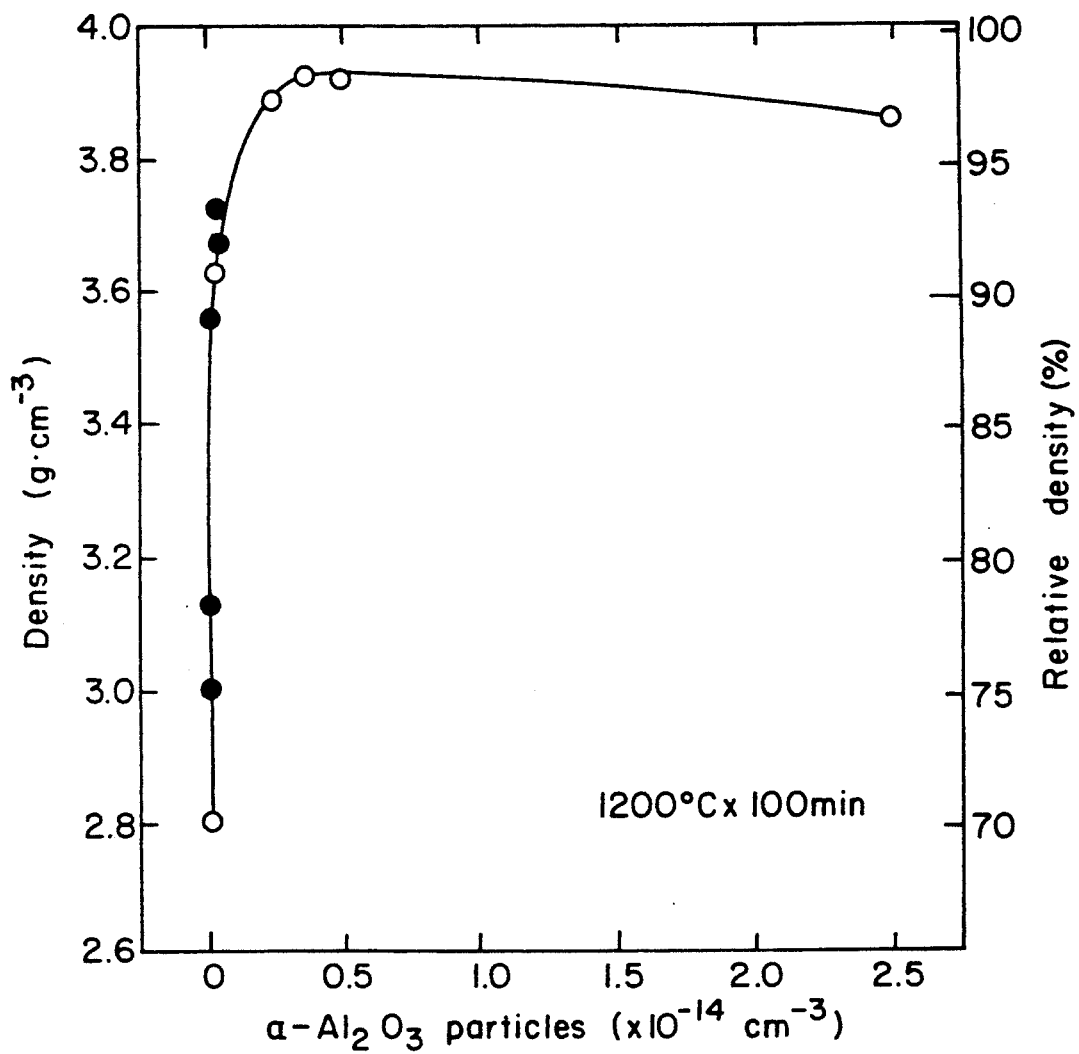

FIG. 19 shows density as a function of number of seed particles per unit volume after heating at 1200° C. for 100 minutes.

DETAILED DISCLOSURE OF THIS INVENTION

This invention relates to dense ceramic sintered bodies produced from precursors and/or metastable materials (generally herein referred to as "material A") of the final sintered bodies with precursor-derived materials and/or metastable material-derived materials as additives (generally herein referred to as "material B"). The quantity of the additive is 0.1 to 100%, based on the number of particles.

Before this invention, it had been a serious problem to control a microstructure during transformation between polyphases. Rapid grain growth and formation of closed pores during the transformation, which cause a decrease in sinterability and lead to non-homogeneous sintered bodies, had been widely observed in ceramic materials.

It has now been discoved in accordance with this invention that the addition of special hetergeneous nucleated material, to be further described hereinafter, providing heterogeneous nucleation phenomena, is remarkably effective to control the microstructure during the transformation, to create a densified product, and to solve the other problems mentioned above. It has also been confirmed experimentally that material B works mainly by providing heterogeneous nucleation sites to form a more stable phase and an entirely different microstructure in the matrix of material A. Homogeneous dispersion of a number of particles of material B results in the concurrent formation of fine, monosized grains in the more stable phase during the transformation.

In accordance with this invention the transformation proceeds by a nucleation and growth process.

In previous processes to initiate the transformation sufficient energy had to be supplied to the system to exceed the nucleation barrier. After nucleation the transformation occurred rapidly by growth. Usually the high surface area product of tranformation sintered to form an aggregated mass because of the temperature requirements for nucleation. To diminish powder aggregation the transformation could sometimes be controlled by using lower temperatures. However, at the lower temperatures excessively long times (e.g. days) were and are required for nucleation and growth.

In accordance with the invention it has now been discovered that the nucleation step may effectively be eliminated by supplying nuclei to the system. This process involves adding ceramic particles (referred to herein as "seed particles") of the high temperature phase to the ceramic matrix to be transformed. By eliminating the nucleation step less energy is required for the transformation and thus it can occur at a lower temperature. Furthermore, by increasing the number of nucleation sites in the system the kinetics are improved and fine grain is obtained.

In the transformation, microstructural development and densification of an alpha alumina seeded boehmite sol gel, alpha alumina particles act as nuclei for the transformation of theta to alpha alumina and result in an increase in the transformation kinetics and lower the transformation temperature by as much as 170° C. By increasing the nucleation frequency or seed concentration, a submicron, aggregate-free microstructure develops rather than the vermicular microstructure usually characterizing the alpha alumina transformation. The transformed alpha alumina sinters to full density with a submicron grain size at 1200° C. This method for microstructure control is believed applicable to the many ceramic systems that transform by nucleation and growth.

There are certain physical requirements of the seed particles relative to the matrix phase to be transformed before seeding is entirely effective. Nevertheless, if properly practiced in accordance with this invention, seeding offers unique control over the transformation process and thus microstructural control and control over densification.

Although the particle size of material B is not necessarily confined to a narrow range, it is desirable to use finer particles of material B for maintaining the grain size small and the sinterability high after the transformation.

It is essential to disperse the particles of material B homogeneously in the matrix of material A. The reason the amount of material B addition is limited to 0.1–100.0% on a particle number basis is that added particles of material B work mainly as heterogeneous nucleation sites in the material A matrix; about 100 particles of material A are estimated to coalesce to form a grain in the more stable phase with 0.1% addition of material B. This estimation has been confirmed to be correct as a result of many experiments. In other words, grain size after transformation becomes ten times as large as the initial particle size of material B. During the grain coarsening, many pores are entrapped in the grains and are left as closed pores even after densification. Accordingly, precise control of the microstructure cannot be expected with less than 0.1% addition of material B.

On the other hand, when an excess amount of material B is added, the properties of the sintered bodies are strongly influenced by material B.

A main objective of this invention is to obtain sintered bodies with fine, homogeneous microstructures using precursors and/or metastable phase materials as starting materials. The amounts of additives should in some cases be as low as possible from both the technological and the economic point of view.

Therefore, to make effective use of the characteristics of this invention, addition of more than 100% of material B is not useful from the point of view of controlling microstructure by using the heterogeneous nucleation phenomena but may be useful for other purposes, for example, to make a better monolith. In many cases, addition of less than 10% of material B is enough to control the microstructure, and in some cases sinterability is reduced with addition of a large amount of material B. Based on the mechanism by which material B works, which is described hereinafter, materials with similar crystal structure and lattice constant to the materials described and disclosed for use as material B can also be effectively used for material B.

EXAMPLE 1

Boehmite (aluminum hydroxide, ALOOH, having average particle size 0.05 $\mu$m) and alpha-alumina (alpha Al$_2$O$_3$, having average particle size 0.1 $\mu$m) were used as materials A and B respectively. 8 mixtures of these two powders which were prepared are shown in Table 1.

TABLE 1

| Mixture No. | Beohmite - alpha Al$_2$O$_3$ System (in % on the basis of particle number) | | | | | | | |
|---|---|---|---|---|---|---|---|---|
| | 1 | 2 | 3 | 4 | 5 | 6 | 7 | 8 |
| Boehmite 0.05 $\mu$m | 100 | 100 | 100 | 100 | 100 | 100 | 100 | 0 |
| Alpha Al$_2$O$_3$ 0.1 $\mu$m | 0 | 0.5 | 0.15 | 1.0 | 3.0 | 10 | 100 | 100 |

Figure 1:
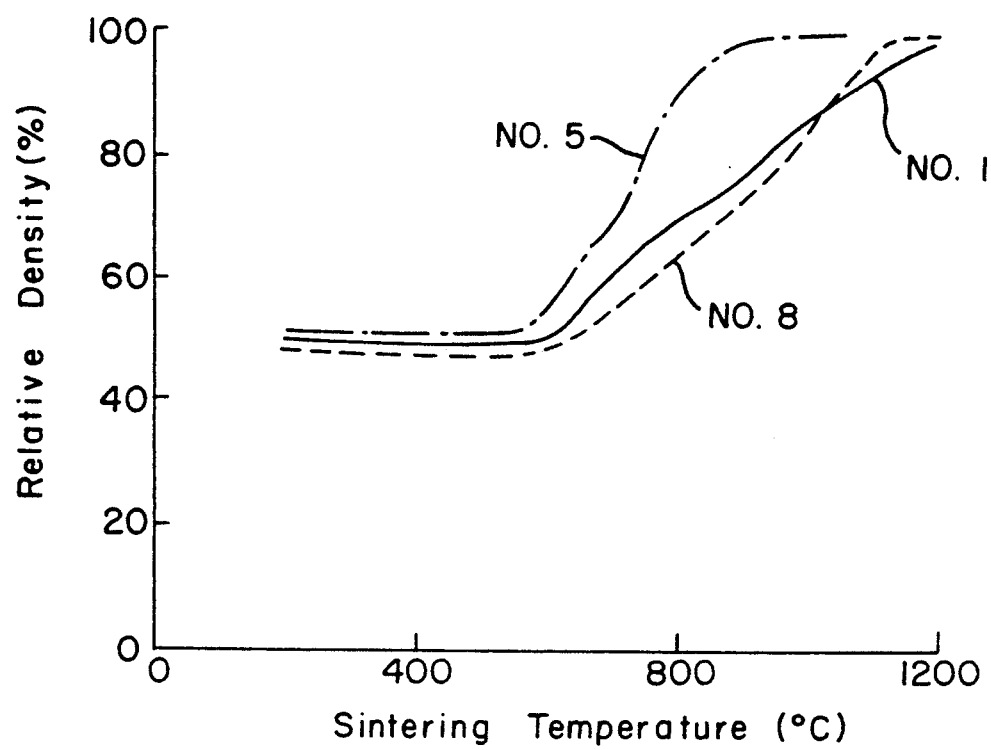
FIG. 1 is a graph showing sintering temperature plotted again relative density in the boehmite-alpha alumina system of Example 1.
Figure 2:
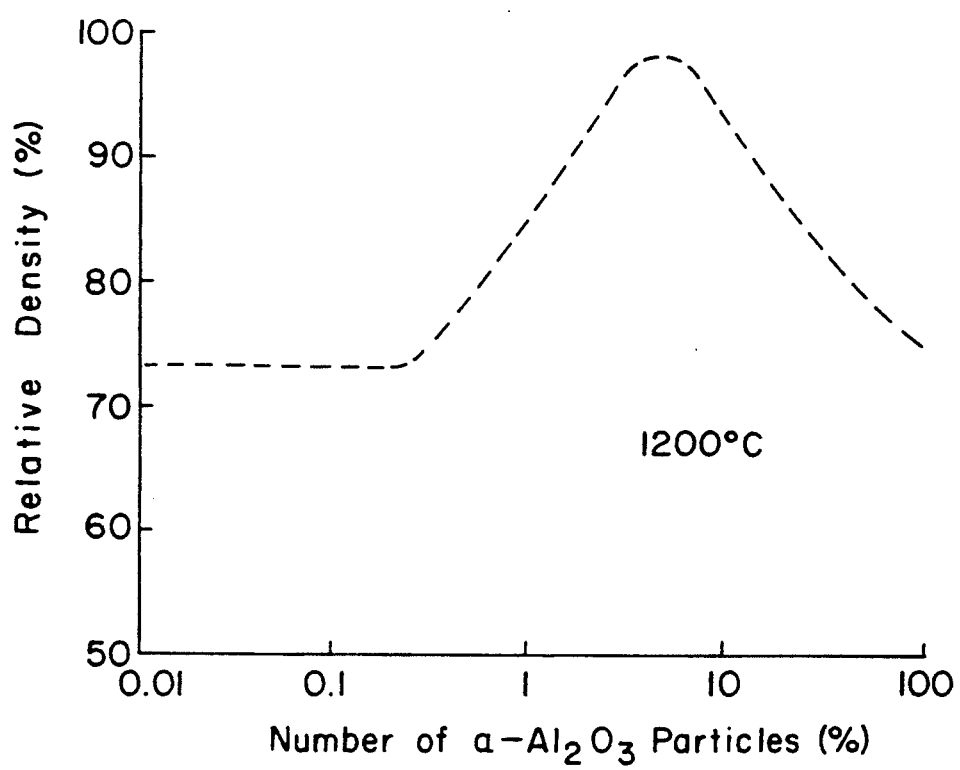
FIG. 2 is a graph showing relative density of the product plotted against the percentage of alpha alumina particles in the boehmite-alpha alumina system of Example 1.

To remove agglomerates, aqueous colloidal dispersions of each powder were prepared by adjusting the pH to a value of 3 and mixed with each other in various ratios as shown in Table 1. The relations between sintered density and temperature are plotted in FIG. 1 for three typical samples. The densities after being sintered at 1200° C. for 100 minutes are plotted as a function of the alpha-alumina addition. Sinterability increases rapidly with alpha-alumina addition; it reaches a maximum at 3% addition and then decreases gradually. Without alpha-alumina addition, 98% relative density is attained only when sintered at greater than 1600° C. Many closed pores, however, were entrapped inside grains and the average grain size was greater than 50 $\mu$m. Neither the sinterability nor the microstructural homogeneity were improved significantly with 0.05% alpha Al$_2$O$_3$ addition.

On the other hand, the sinterability was improved considerably with alpha Al$_2$O$_3$ addition greater than or equal to 0.1%. 98% relative density was attained for a sample with 3% alpha Al$_2$O$_3$ addition after having been sintered at 1200° C. for 100 minutes.

The average grain size of the sintered body was less than 1 $\mu$m with few closed pores inside the grains.

Although samples with greater than 3% addition have a much better microstructure as well as higher sinterability than those without addition, the degree of improvement in terms of microstructure and sinterability decrease with increasing of amount of addition.

EXAMPLE 2

Anatase structure titanium dioxide (TiO$_2$, having average particle size 0.05 $\mu$m) and rutile structure titanium dioxide (TiO$_2$, having average particle size 0.1 $\mu$m) were used as materials A and B respectively. 8 mixtures of these two powders which were prepared are shown in Table 2.

TABLE 2

| Mixture No. | Anatase - Rutile System (in % on the basis of particle number) | | | | | | | |
|---|---|---|---|---|---|---|---|---|
| | 1 | 2 | 3 | 4 | 5 | 6 | 7 | 8 |
| Anatase | 100 | 100 | 100 | 100 | 100 | 100 | 100 | 0 |
| Rutile | 0 | 0.1 | 0.3 | 2.0 | 5.0 | 10 | 100 | 100 |

Figure 3:
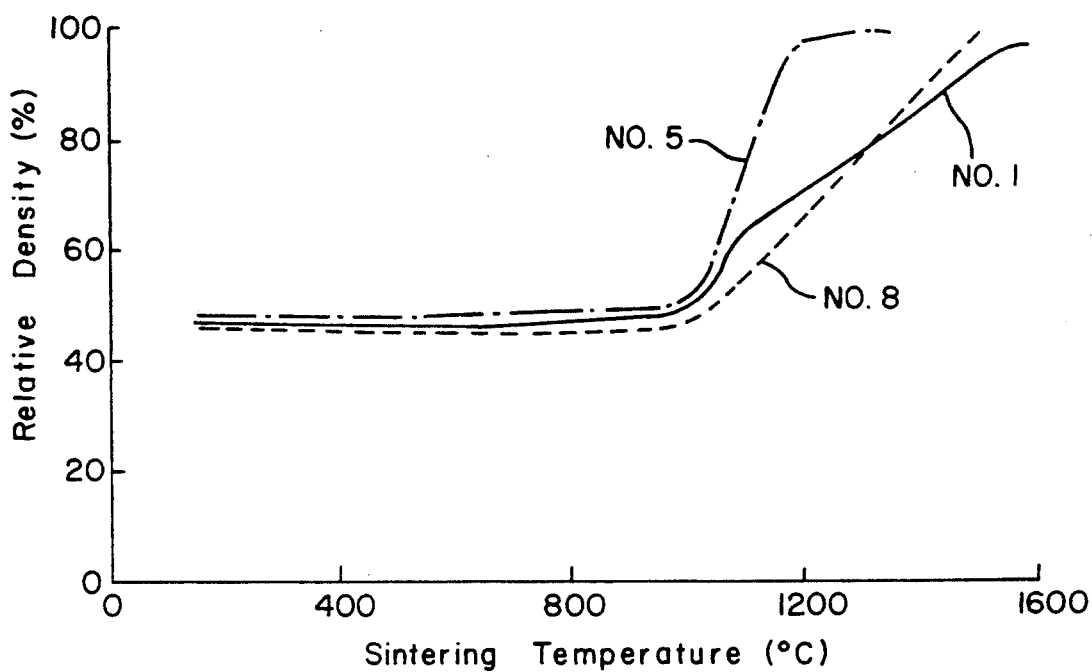
FIG. 3 shows relative density plotted against sintering temperature in the ($TiO_2$) anatase-rutile system of Example 2.
Figure 4:
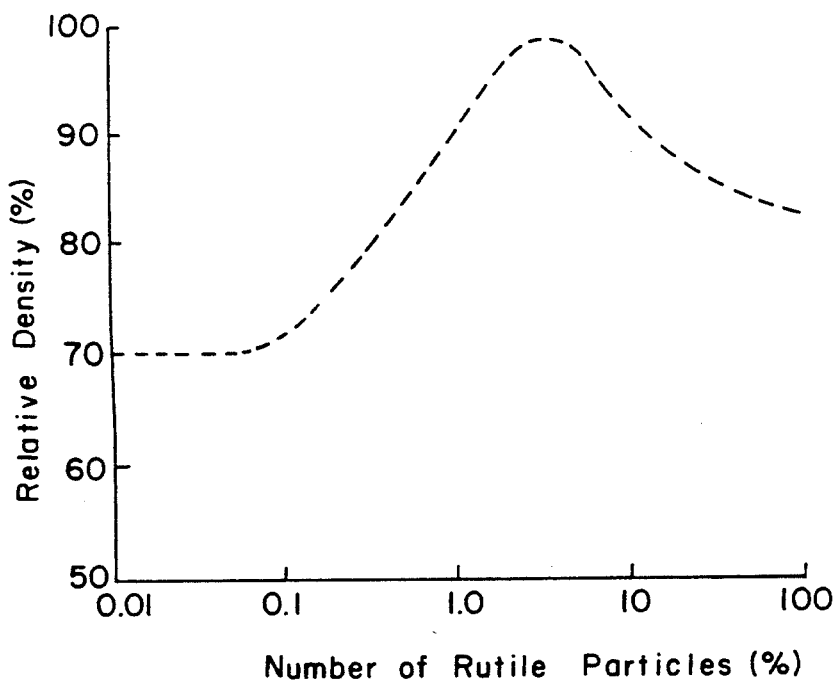
FIG. 4 shows, for the system of Example 2, relative density plotted against the number of rutile particles.

Aqueous colloidal dispersions of each powder were prepared and mixed in the same way as in Example 1. The relationship between sintered density and temperature are plotted in FIG. 3 for three typical samples. The densities after having been sintered at 900° C. for 100 minutes are plotted as a function of rutile addition in FIG. 4. Sinterability increases rapidly with rutile addition; it reaches a maximum at 3% addition and then decreases gradually. Both sinterability and microstructure are remarkably improved with rutile addition of greater than or equal to 0.1%. This tendency is very much similar to that of the ALOOH-alpha Al$_2$O$_3$ system described heretofore. Thus, Example 2 demonstrates the applicability of the invention to oxides of titanium.

Additional aspects of the invention are apparent from the following:

When heated, boehmite transforms to alpha $Al_2O_3$ by the following sequence:

with the final transformation from theta occurring at about 1200° C. These transformations are characterized in terms of pore development, mechanistic and structural aspects, and time and temperature dependence. Dehydration of boehmite is topotactic (the crystal structure transforms without destruction of the original crystal morphology) and occurs at about 450° C. to form gamma $Al_2O_3$ having a well-defined pore structure. With further heating, transformation to the other transitional phase aluminas such as delta and theta also occurs topotactically, with changes in the pore structure to accommodate densification. In the final stage of transformation boehmite and alum ($NH_4ALSO_4$) transform to alpha alumina by a nucleation and growth process at about 1200° C. After complete transformation to alpha $Al_2O_3$ the microstructure consists of a vermicular network in which both the pore and solid phase are contiguous and the pore channels are of the same scale as the alpha $Al_2O_3$ grains. This sequence of physical changes is not unique to boehmite but occurs for all of the hydrous and metastable forms of alumina.

To demonstrate the aspect of the invention whereby nucleation of seeding has been found to provide control over the transformation process, and hence microstructural control and control over densification, additional seeding tests were conducted in reconstructive transformation of crystalline forms of alumina. To ensure the homogeneous distribution of the seed particles, a colloidal boehmite (AlOOH) with an ultimate crystallite size of 10 nm was used. A boehmite sol gel system was used because a gel offers the advantages of uniform dispersion of individual seed particles in the matrix as well as uniform packing of the surrounding gel matrix adjacent to the seed particles. As nucleation of alpha $Al_2O_3$ is difficult, alpha $Al_2O_3$ particles were added to the boehmite gel to seed the theta to alpha $Al_2O_3$ transformation. Prior to seeding, agglomerates were removed from the boehmite hydrosol by dispersing it with nitric acid at pH 2.5 and then settling for extended times. The seed particles were also dispersed at pH 2.5 and settled to obtain an agglomerate-free alpha $Al_2O_3$ slurry having a median particle size of 0.1 μm. After adding seed particles to a 20 wt % boehmite sol, it was gelled by dehydration and air-dried for 10 days. Dried gel fragments of about 1.0 cm were used in the sintering studies. For transformation studies the dried gel was hand-ground to pass a 325 mesh screen (−44 μm). Isothermal transformation kinetics were determined by quantitative X-ray analysis. All densities were measured by Archimedes' technique.

Figure 5:
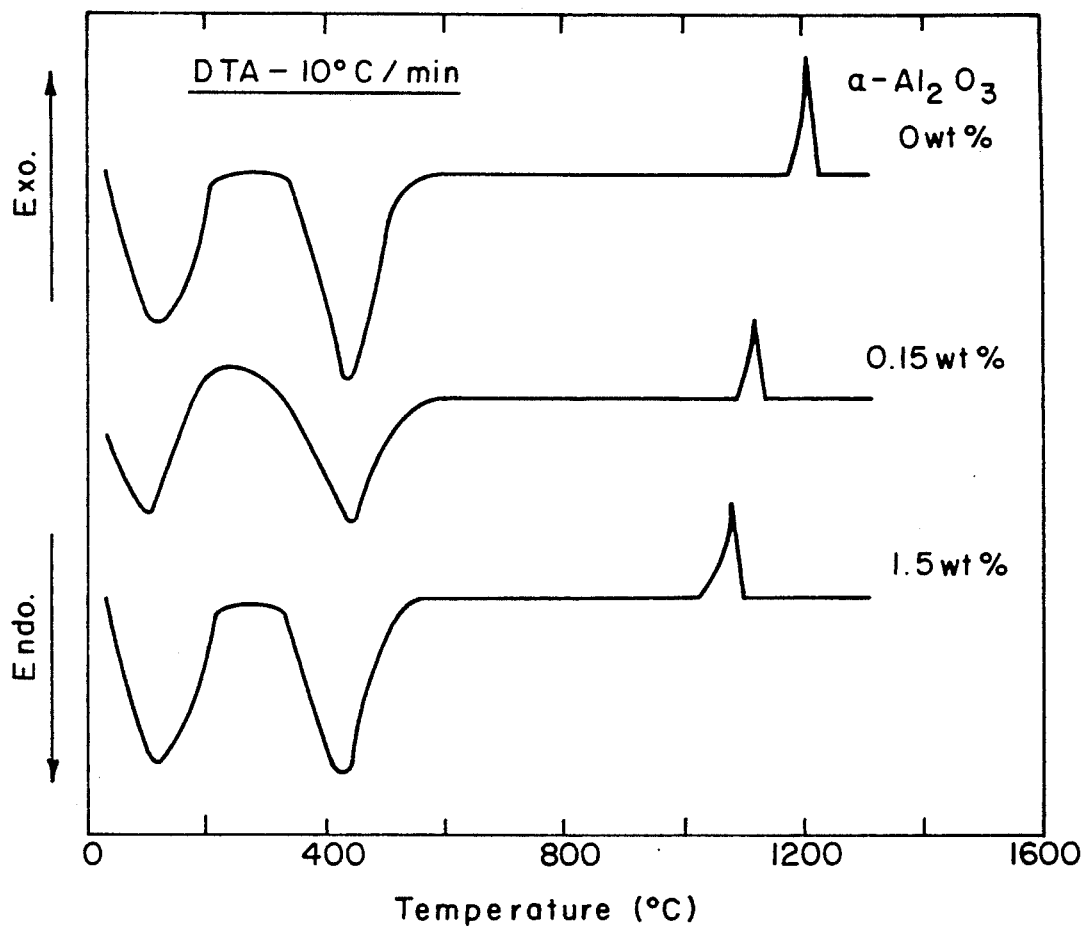
FIG. 5 shows differential thermal analysis of alpha $Al_2O_3$ seeded and unseeded boehmite gels.
Figure 6:
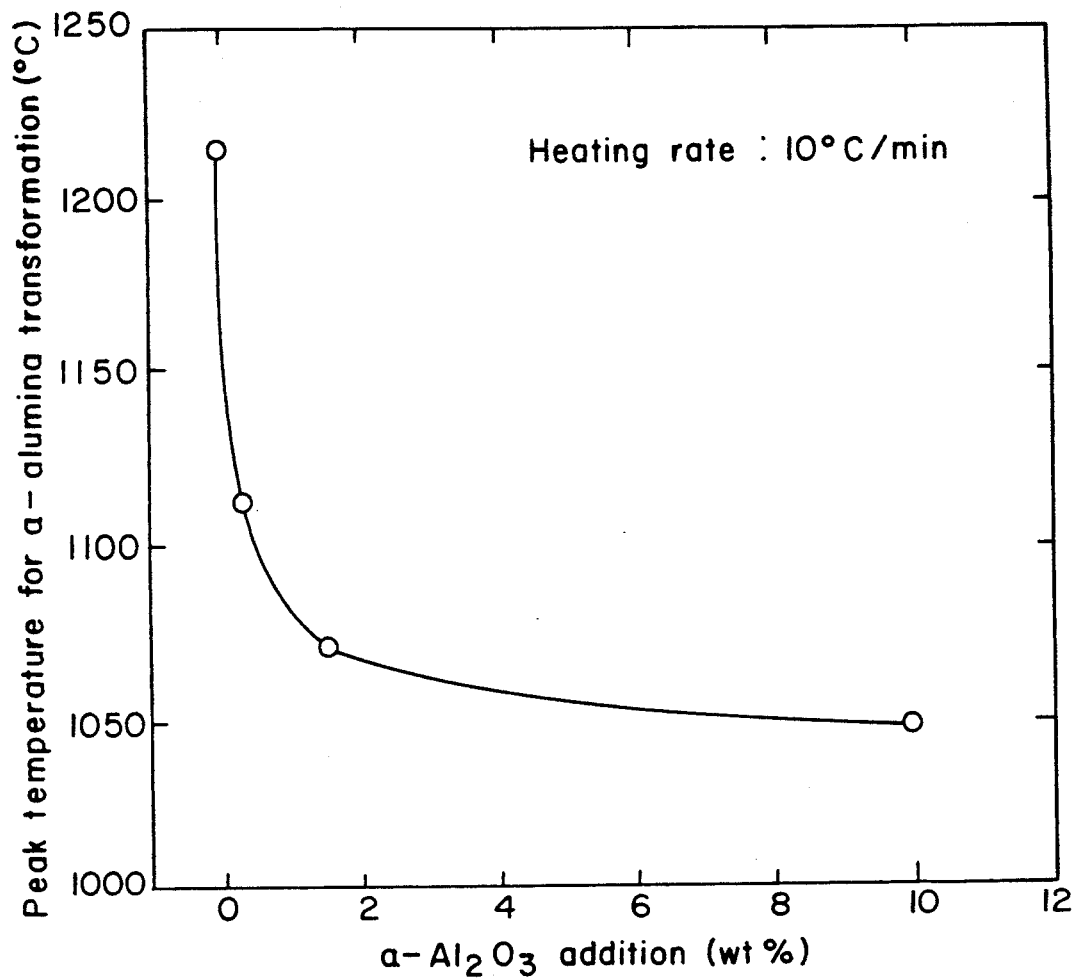
FIG. 6 shows change in the theta to alpha $Al_2O_3$ peak transformation temperature as a function of alpha $Al_2O_3$ seeding.

Nominal 0.1 μm alpha $Al_2O_3$ seeds were added to the hydrosol to concentrations of 0.05 to 10 wt % on a dry weight basis. As seen from the DTA data in FIG. 5, only the theta to alpha $Al_2O_3$ transformation temperature was affected by alpha $Al_2O_3$ seeding. The transformation peak temperature was reduced by about 170° C., confirming that seeding reduces the transformation temperature. The plot of the transformation peak temperature as a function of seeding concentration in FIG. 6 shows that 1.5 wt % alpha $Al_2O_3$ seeding reduced the transformation temperature by 150° C. Hence, excessive quantities of seed particles are not necessary to affect significantly the boehmite to alpha $Al_2O_3$ phase transformation.

Figure 7:
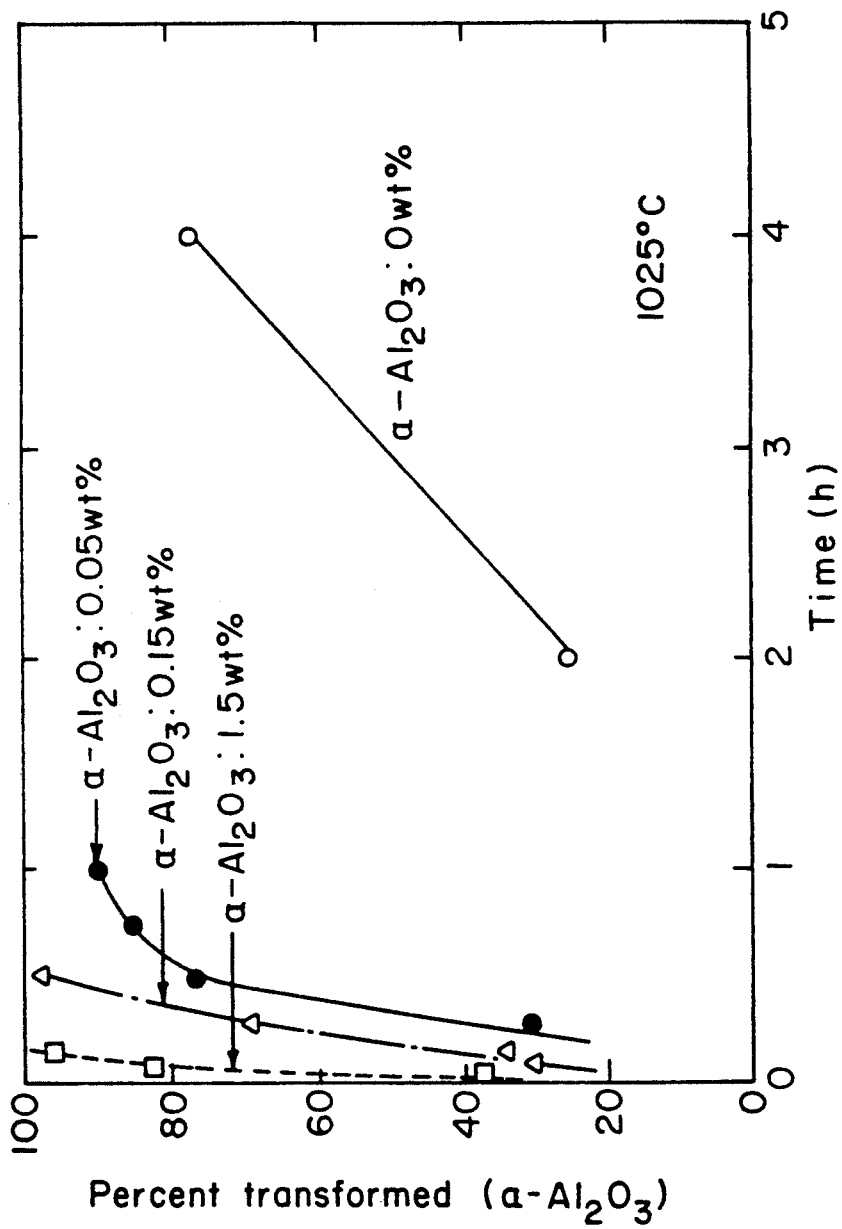
FIG. 7 shows transformation kinetics of alpha alumina seeded boehmite to alpha alumina at 1025° C.

In FIG. 7 the isothermal transformation kinetics between seeded and unseeded boehmite gels at 1025° C. are compared. The transformation kinetics of the seeded systems are enhanced because the longer incubation period for nucleation that characterizes nucleation and growth transformations is not necessary. From the DTA temperature shift and the increased kinetics, the alpha $Al_2O_3$ particles act as nuclei for the theta to alpha $Al_2O_3$ transformation.

The series of micrographs in FIG. 8 illustrate the observed microstructural evolution of the seeded and unseeded boehmite gels at 1025° C. The unseeded sample was heated for 2 hours before significant transformation occurred. The area of larger grain size in FIG. 8a is an alpha $Al_2O_3$ colony surrounded by the theta $Al_2O_3$ matrix. It is considered that this colony has grown from a single nucleus. In FIG. 8b is a 0.15 wt % seeded sample after heating for 15 minutes at 1025° C. This sample was about 70% transformed and characterized by multiple alpha $Al_2O_3$ colonies smaller than observed in the unseeded sample. The number of colonies is a function of the seeding concentration, whereas the smaller colony size is a result of the reduced time and temperature conditions required for transformation. Colony size would increase until impingement with adjacent colonies if heated for longer times at this temperature, assuming no additional nucleation in the sample. The 1.5 wt % seeded sample shown in FIG. 8c was about 95% transformed after 10 minutes at 1025° C. The alpha $Al_2O_3$ grains are 0.1 μm and do not show the continuous pore and alpha $Al_2O_3$ structures in FIGS. 8a and 8b. Comparison of this microstructure to the theta $Al_2O_3$ matrix in FIG. 8a showed that the alpha $Al_2O_3$ grains are significantly larger than the matrix material. This indicates that the alpha $Al_2O_3$ grains have grown from a single nucleus. Observed grain size agrees with calculated alpha $Al_2O_3$ grain size if spherical geometry and uniform distribution of boehmite per nucleus is assumed. From these experiments, as shown in the micrographs, the number of nucleation sites strongly affects whether deleterious alpha $Al_2O_3$ aggregates or individual alpha $Al_2O_3$ grains form. By increasing seeding concentration, volume transformed per nucleus is decreased such that the alpha $Al_2O_3$ transformed per nucleus is much less than in the unseeded boehmite gel. Consequently, large vermicular alpha $Al_2O_3$ colonies that characterize unseeded $Al_2O_3$ transformations cannot develop. The major microstructural differences are the relative distribution of the porosity and solid phase. The unseeded microstructure has a continuous pore phase interwined with the interconnected alpha $Al_2O_3$ grain colonies whereas the pore phase is evenly distributed between individual, solid alpha $Al_2O_3$ grains in the seeded sample.

Sintering kinetics of unseeded and 1.5 wt % seeded fragments is shown in FIG. 9 for sintering temperatures of 1150° C. to 1260° C. The sample was heated at 50° C./minute to the sintering temperature. Unseeded samples did not significantly density during this experiment and reached a maximum relative density of 75%. In contrast, the seeded sample was fully dense after 40 minutes at 1220° C. At 1185° C., 150 minutes is needed to achieve full density and 6 hours is required to reach 97% of theoretical density at 1150° C. No MgO was added to these samples to inhibit exaggerated grain growth.

The excellent densification of the seeded samples is a result of the uniform, fine-grained microstructure developed during transformation. A major difference between the seeded and unseeded samples before sintering is the connectivity and distribution of the pore and grain phases-an aggregated structure formed during transformation in the unseeded samples whereas an aggregate-free microstructure formed in the seeded sample.

Microstructural evolution of the 1.5 wt % alpha $Al_2O_3$ seeded sample during sintering at 1185° C. was observed and is shown representatively in FIG. 10. The microstructure in FIG. 10a shows the about 0.1-0.2 $\mu$m alpha $Al_2O_3$ grains which developed upon transformation after 2 minutes. This sample is 71% dense, indicating that there has already been some densification. After 20 minutes at 1185° C. (FIG. 10b) the microstructure is characterized by clusters composed of 0.05-0.1 $\mu$m particles of alpha $Al_2O_3$. The cracks are believed related to shrinkage within the clusters as a result of volume change during the theta to alpha $Al_2O_3$ transformation and/or as a result of differential shrinkage during sintering of the theta $Al_2O_3$ prior to transformation. Densification of the sample involves both intercluster and intracluster sintering. The sample is 99% dense after 100 minutes at 1185° C. and, as shown in FIG. 10c, the grain size ranged from 0.1 to 0.5 $\mu$m with the average of 0.45 $\mu$m. Some cracks were still present in this microstructure but after 150 minutes at 1185° C. the sample was 99% dense and there was no evidence of cracks in the microstructure—see FIG. 10d.

The low sintering temperature of these samples results from the exceptionally fine grain size of the alpha $Al_2O_3$ formed as a result of the sol gel process and the controlled transformation to alpha $Al_2O_3$. The active grain size for sintering is less than 0.1 $\mu$m—this is the alpha $Al_2O_3$ grain size within the clusters after transformation. Initial stage densification is controlled by local densification at unit contacts and within the alpha $Al_2O_3$ clusters, whereas final stage densification is controlled by the sintering of the almost fully dense alpha $Al_2O_3$ clusters or grains.

These tests whose results are shown in FIGS. 5 through 10 clearly demonstrate the aspect of the invention whereby the transformation to alpha $Al_2O_3$ can be accelerated by nucleating it with alpha $Al_2O_3$ seed particles. These results further indicate that part of the transformation control aspect of the invention is the provision of copious nucleation sites for transformation.

The reason for the strong influence of seed concentration is believed due to the degree of refinement (volume per seed) that is attained upon transformation. These tests further show that the seeding of the alpha $Al_2O_3$ transformation has a dramatic effect on the transformation temperature and kinetics, the microstructure after transformation and the sintering process. From this it is believed that seeding can have a large effect on various transformation processes and a variety of other ceramics which transform by a nucleation and growth process may benefit by seeding their transformations.

To demonstrate the aspect of the invention whereby nucleation or seeding provides enhanced resultant densification of a sol-gel sintered to affect reconstructive transformation to a high density alpha form, a series of tests was conducted.

Samples were prepared from a high-purity (i.e. 99.9% $Al_2O_3$ after ignition) boehmite powder formed by the Zeigler process and having a BET surface area of 268 $m^2/g$. Clear hydrosols were prepared by dispersing 20 wt % boehmite powder; in water and adjusting the pH to 3.0 with nitric acid. The hydrosol was gelled by evaporation at room temperature and dried at room temperature for 10 days before firing. For most systems this process resulted in monolithic samples of about 1 cm high and 2 cm in diameter. A series of seeded samples was prepared by mixing 2.0 wt % alpha-alumina powder on a dry-weight basis to the dispersed hydrosol. After the sample was stirred, it was allowed to settle until a clear sol was formed. The samples were gelled and dried in the same manner as the hydrosol. Only the clear portion of the dried gel was sintered. A second series of gels was also prepared by adding 2.0 wt % alpha-alumina powder (average particle size was less than 0.5 $\mu$m) to the hydrosol and gelling the sol before the alpha-alumina particles could settle out. For comparison, compacts 0.4 cm high and 1.25 cm in diameter were formed by uniaxially pressing the boehmite powder without binder in a lubricated steel die at 105 MPa.

Gel fragments and the pressed pellets were sintered by continuous heating in air from room temperature to 500° C. in 2.5 hours, 500° C. to 850° C. in 1.5 hours, 850° C. to 1200° C. in 20 minutes and at about 15° C./minute to higher sintering temperatures. The samples were held at the sintering temperature for 100 minutes. Densities were measured by the Archimedes technique. Samples with open, surface-connected porosity were coated by dipping them into molten paraffin wax before measuring density.

The density of the samples after sintering at 500° C. to 1600° C. for 100 minutes is shown in FIG. 11. Each data point represents either 1 or 2 samples with the variability for two samples being within the size of the data point on the graph. The powder compact sintered to low density at each temperature and sintered to about 94% of theoretical density at 1600° C. The unseeded sol-gel samples sintered to higher densities than the compacts. The difference in densification is probably a result of the more homogeneous grain microstructure that is obtained with the sol-gel process. The seeded gels sintered to 3.92 $g/cm^3$ (i.e. 98% theoretical density) when sintered at 1200° C. to 1400° C. At 1100° C. the seeded sample was 72% dense, which is significantly greater than the powder compact sample.

The microstructure of the seeded gel at various stages of densification was observed. The unfired gel consisted of a dense, uniform packing of less than 0.1 $\mu$m AlOOH particle clusters of boehmite crystallites, as can easily be appreciated by considering the surface area of the powder; i.e. with a surface area of 268 $m^2/g$, the equivalent spherical diameter of the boehmite particles ($\rho_o = 3.1$ $g/cm^3$) is 7.2 nm. On heating the dried gel for 100 minutes at 1050° C., it first transforms to gamma alumina at about 400° C., to theta alumina at about 800° C., and to alpha alumina at about 1000° C. Generally, the microstructure consisted of uniform, 0.1-to 0.2-$\mu$m alpha alumina grains and fine porosity between the grains.

After sintering the seeded gel at 1200° C., the microstructure was observed to be dense, with only submicrometer grains and some pores located at the grain vertices. In sharp contrast, both the compacted boehmite and unseeded gel samples had a submicrometer, vermicular grain structure and pores on the same scale as the alumina grains. When sintered to high density, these samples were characterized as having grains larger than 50 μm and pores about 1 μm in size located at the grain boundaries and within the grains.

These results demonstrate that by increasing the number of nuclei by seeding, the growth of the alpha alumina particles is limited. Thus, a uniform, fine-grained high density alpha alumina microstructure is developed on transformation, not an extensive vermicular microstructure as is usually observed when transition-phase aluminas are heated. Consequently, the seeded sol-gel sinters uniformly and at a reduced temperature to produce a high density product.

To demonstrate the aspect of the invention whereby seed parameters have been found to affect and provide a means for control over and regulation of the transformation process and the resulting product, a series of tests was conducted.

Samples were prepared from a Zeigler process boehmite powder having a BET surface area of 268 $m^2/g$. After ignition the boehmite yields 99.7% $Al_2O_3$ with about 0.2% $TiO_2$. Clear hydrosols were prepared by dispersing 20 wt % boehmite powder in water and adjusting the pH to 2.5 with nitric acid. Large agglomerates were removed from the hydrosol by settling for 3 hours. A series of seeded samples were prepared by adding 0.15 to 10 wt % of dispersed alpha $Al_2O_3$, on a dry weight basis, to the dispersed hydrosol. The hydrosols were gelled by stirring on a hot plate.

The alpha $Al_2O_3$ particles used for seeding were obtained by dispersing commercial alpha $Al_2O_3$ powder at pH=2.5 with nitric acid. The dispersion was stirred for two days to break up agglomerates and the larger particles; remaining agglomerates were removed by settling for 2 weeks. The particle size distribution of the alpha $Al_2O_3$ seeds was measured using a Model CAPA 500 centrifugal particle size analyzer available for Horiba Instruments, Inc., Irvine, Calif.

Gel fragments were sintered by continuous heating in air from room temperature to 500° C. in 2.5 hours, 500° C. to 850° C. in 1.5 hours, 850° C. to 1200° C. in 20 minutes and at about 15° C./minute to the next higher sintering temperature. The samples were held at the sintering temperature for 100 minutes. Densities were measured by the Archimedes technique. Samples with open, surface connected porosity were coated with paraffin prior to density measurement.

The boehmite to alpha $Al_2O_3$ transformation was examined by heating 50 mg samples in Pt. cups at a rate of 10° C./min in a DTA. The transformation kinetics to alpha $Al_2O_3$ were measured by quantitative X-ray analysis for samples heated by the same schedule used for the sintering, namely by continuous heating in air from room temperature to 500° C. in 2.5 hours, 500° C. to 850° C. in 1.5 hours, with the increase being at about 15° C./minute to the next higher sintering temperature; the measurements were made after holding at 1025° C. for 1 to 240 minutes. The relative degree of transformation was quantified by using the integrated intensities of the (1123) reflection for alpha $Al_2O_3$ and the (111) reflection for the monoclinic $ZrO_2$ internal standard. The percent alpha $Al_2O_3$ was determined by comparison to an $Al_2O_3$-$ZrO_2$ calibration curve.

Microstructures of as-fired surfaces, fracture surfaces and polished surfaces were examined by SEM after gold coating. Polished samples were thermally etched at 50° C. less than the sintering temperature for about 80 minutes to reveal the grain structure.

The particle size distribution of the alpha $Al_2O_3$ particles used for seeding is presented in Table 3.

TABLE 3

| Particle Diameter (μm) | | number % MATERIAL A | number % MATERIAL B |
|---|---|---|---|
| >1.00 | | 0 | 0.60 |
| 1.00 | 0.95 | 0 | 0.32 |
| 0.95 | 0.90 | 0 | 0.26 |
| 0.90 | 0.85 | 0 | 0.36 |
| 0.85 | 0.80 | 0 | 0.50 |
| 0.80 | 0.75 | 0 | 0.78 |
| 0.75 | 0.70 | 0 | 1.05 |
| 0.70 | 0.65 | 0.008 | 1.28 |
| 0.65 | 0.60 | 0.008 | 1.94 |
| 0.50 | 0.55 | 0.010 | 3.42 |
| 0.55 | 0.50 | 0.025 | 4.77 |
| 0.50 | 0.45 | 0.015 | 7.04 |
| 0.45 | 0.40 | 0.042 | 8.26 |
| 0.40 | 0.35 | 0.072 | 12.18 |
| 0.35 | 0.30 | 0.19 | 14.96 |
| 0.30 | 0.25 | 0.32 | 10.81 |
| 0.25 | 0.20 | 1.09 | 11.27 |
| 0.20 | 0.15 | 9.38 | 11.98 |
| 0.15 | 0.10 | 45.49 | 8.22 |
| 0.10 | 0.05 | 43.35 | 0 |
| 0.05> | | 0 | 0 |

Because the alpha $Al_2O_3$ was dispersed at pH 2.5 and settled for 2 weeks, the distribution is for individual, non-agglomerated particles. The median particle size by number is about 0.1 μm and the distribution ranges from 0.06 to 0.2 μm.

DTA provides an experimentally expedient method for gauging the effectiveness of seeding on phase transformations. In these tests only the exotherm associated with the theta to alpha $Al_2O_3$ transformation was affected by seeding. The temperature maximum for the theta to alpha $Al_2O_3$ transformation as a function of the weight percent alpha $Al_2O_3$ seeds was essentially identical to that shown in FIG. 6. The transformation temperature was 1215° C. for unseeded samples and decreased to 1050° C. with 10 wt % alpha $Al_2O_3$; however, only 1.5 wt % seeding reduced the transformation temperature to 1075° C.

The transformation kinetics to alpha $Al_2O_3$ for samples seeded with 0.05, 0.15 and 1.5 wt % alpha $Al_2O_3$ and heated at 1025° C. for various times were compared to unseeded samples and found to be essentially identical to those shown in FIG. 7. The unseeded $Al_2O_3$ is about 50% transformed after 3 hours and by extrapolation about 4.7 hours would be required for complete transformation. In contrast, the 1.5% sample is 50% transformed after 3 minutes and completely transformed in less than 15 minutes. The 0.15% sample follows kinetics that are similar to the 1.5% sample. The 0.05% sample initially has the approximate kinetics observed at the higher seeding concentrations but after about 75% transformation, the transformation rate decreases to a level closer to that observed for the unseeded sample. Because the transformation kinetics follow a two stage process, the kinetics apparently correspond to a mixture of two processes in which the initial kinetics is a result of controlled nucleation and growth and latter stage transformation proceeds by a growth process similar to that observed in the unseeded samples.

The dessicated gels were about 60% of theoretical density. Their structure shown representatively in FIG. 12, was the same for both seeded and unseeded samples and consisted of smaller than 0.1 μm spherical clusters of boehmite. The average cluster size was observed to vary from 0.02 to 0.08 μm diameter in these tests; these differences did not have any apparent effect on the transformation kinetics or subsequent microstructural development.

Gel microstructures were examined after heating at 1025° C. to various degrees of transformation. The unseeded sample was 25% transformed after 2 hours and was characterized by isolated, transformed alpha $Al_2O_3$ regions that were about 1-2 μm in diameter and composed of contiguous alpha $Al_2O_3$ grain structure which are single crystals. A sample with 0.15% alpha $Al_2O_3$ seeding was 70% transformed after heating for 15 minutes at 1025° C. In contrast with the unseeded sample, the transformed regions were smaller. The 1.5% alpha $Al_2O_3$ seeded sample was 95% transformed after heating at 1025° C. for 5 minutes and consisted of separate alpha $Al_2O_3$ grains. There were some regions in which the grains interconnected to form pore-free grain doublets and triplets. Because the scale of the transformed zones diminishes with increased seeding concentration, the porosity associated with the transformation is not contained within the transformation zone, as occurs in unseeded samples.

The effect of the transformed structures on microstructural development was further examined by heating samples at 1050° C. for 100 minutes; representative structures are shown in FIG. 13. The unseeded sample surface consisted of about 10 μm diameter isolated regions of alpha $Al_2O_3$ in a matrix of theta $Al_2O_3$. A crack-like structure developed in the transformed region, probably as a result of the volume change on transformation. The sample seeded with 0.15% alpha $Al_2O_3$ was completely transformed and the alpha $Al_2O_3$ grains were between 0.1 to 0.4 μm. There appeared to be few isolated pores within the alpha $Al_2O_3$ grain structures. The 1.5% seeded sample consisted of grains that were well-ordered and 0.1 to 0.3 μm in size.

Sintered density as a function of temperature for the seeded and unseeded samples is presented in FIG. 14. Density of all samples was at least 65% of theoretical at 1050° C. and for the 1.5% sample was 72% of theoretical. This density difference is attributed to the fact that the seeded samples had already commenced sintering whereas the unseeded sample was still transforming. The unseeded sample did not exceed 95% relative density until 1600° C. However, in excess of 98% relative density was achieved at 1300° C. for the 0.15% sample and at 1200° C. for the 1.5% seeded sample. The 1.5% sample was almost 95% dense at 1150° C.

Representative microstructures of sample surfaces after sintering at 1100° C. for 100 minutes are shown in FIG. 15 for the 0.15 and 1.5% seeded samples. Although the microstructures appeared similar, there was a difference in the type of porosity and, as in FIG. 15, the amount of porosity. The 0.15% sample had some porosity that was surrounded by interconnecting grains; this type of pore structure was absent in the more highly seeded sample. There were relatively dense regions in the 1.5% seeded sample. Hence, high density alpha $Al_2O_3$ may be obtained at this temperature by sintering for a longer time.

Representative microstructures of seeded samples sintered at 1200° C. are shown in FIG. 16. As a result of the relatively low density (about 91%) in the 0.15% sample, there was a considerable amount of grain pullout during polishing. Nevertheless, grain and pore structures could clearly be seen. Larger pores were thought to be the pores that were surrounded by grains, such as those which may be observed in FIGS. 13 and 15. In sharp contrast, the 1.5% seeded sample was nearly fully dense and the grains were smaller than 1 μm.

Representative final microstructures appearing in FIG. 17 show the seeded samples which were observed in relation to the unseeded sample after sintering at 1300° C. for 100 minutes. The seeded samples were highly dense and the unseeded sample was characterized by rather large pores and coarse grains. The 1.5% sample had a larger grain size than the 0.15% sample because porosity was eliminated earlier in the 1.5% sample; thus grain boundaries were pinned for a shorter time than in the 0.15% sample.

These tests demonstrate the aspect of the invention whereby by controlling the transformation it is possible to restrict growth to a fine scale. The excellent densification behavior of the seeded samples is a result of the uniform, fine-grained microstructure developed during transformation.

The major difference between the seeded and unseeded samples before sintering is the connectivity and distribution of the pore and grain phases. An aggregated structure forms during transformation in the unseeded sample whereas an aggregate-free microstructure develops in the seeded samples.

No MgO was added to these samples to inhibit exaggerated grain growth.

To demonstrate how seed size and concentration affect sintering, 0.4 μm alpha $Al_2O_3$ particles were added to a boehmite hydrosol. The 0.4 μm particles were obtained by settling the same commercial alpha $Al_2O_3$ powder as used for the 0.1 μm seeds. The number particle size distribution of the 0.4 μm seeds ranged from 0.1 to 0.8 μm; see Table 3.

In FIG. 18 the sintered density after 100 minutes at 1200° C. is plotted as a function of weight percent alpha $Al_2O_3$ for the two different seed sizes. The finer seed particles have a much greater effect on densification in that density in excess of 95% was obtained for all concentrations above 1 wt %. In contrast, the highest density was only about 93% for the 0.4 μm alpha $Al_2O_3$ seeded samples. Hence, finer particles enhance sinterability.

When sintered density is plotted as a function of the number of alpha $Al_2O_3$ particles added per unit volume of boehmite, as shown in FIG. 18, there is no apparent effect of seed size, within the limits of this experiment. These data suggest that the optimum seeding concentration or nucleation frequency is about $5 \times 10^{13}$ seeds/cm$^3$ of boehmite gel; this optimum is a reflection of the point at which the highest sintered density is attained. At 10 wt % seeds the density decreases slightly. This decrease is believed due to less control of seed dispersion and formation of agglomerates in the gel.

The number of seeds is important to successfully control the transformation. For example, $10^{12}$ seeds/cm$^3$ has little influence on transformation of boehmite to alpha $Al_2O_3$ whereas $5 \times 10^{13}$ seeds/cm$^3$ (or 1.5 wt % 0.1 μm particles) represents an optimum concentration for the theta to alpha transformation, based on the sintering results. The reason for the strong influence of seed concentration is due to the degree of grain refinement (volume per seed) by controlled transformation. See FIG. 19.

Additional applications where seeding offers interesting opportunities include powder synthesis by decomposition and solid state, vapor phase and liquid phase reactions, because these are often nucleation and growth processes. Furthermore, seeding may play an important role in the adaptation of these synthesis processes to in situ ceramic fabrication as per the tests with boehmite noted herein.

What is claimed is:

1. A method for solid-state transformation of a metastable aluminum oxide compound from one crystalline form to another, said compound having a high activation energy and being confronted with a high activation nucleation energy barrier to such transformation, comprising:
   (a) preparing an aqueous colloidal dispersion of a multiplicity of solid particles of said oxide compound;
   (b) preparing an aqueous colloidal dispersion of 0.1% up to 10% of a multiplicity of solid-state nucleation particles, based on the number of particles of said oxide, said nucleation particles having crystallographically similar structure to act as nuclei for the transformation;
   (c) intimately contacting and mixing said dispersions into a homogeneous mixture;
   (d) causing said mixture to gel by dehydration; and
   (e) sintering the gelled and dried mixture in the solid-state between about 1050° C. and about 1150° C. to transform said compound from one crystalline form to another by initiation of grain nucleation and growth, said transformed compound reaching between about 65 and 97% of theoretical density and said transformation being effected independently of growth of the nucleation particles, said transformed compound having submicron sized grains and a substantially evenly distributed pore phase.

2. A method for solid-state transformation of a metastable aluminum oxide compound from one crystalline form to another, said compound having a high activation energy and being confronted with a high activation nucleation energy barrier to such transformation, comprising:
   (a) preparing an aqueous colloidal dispersion of a multiplicity of solid particles of said oxide compound by adjusting the pH thereof;
   (b) preparing an aqueous colloidal dispersion of 0.1% up to 10% of a multiplicity of solid-state alumina nucleation particles, based on the number of particles of said oxide, said nucleation particles having crystallographically similar structure to act as nuclei for the transformation;
   (c) intimately contacting and mixing said dispersions into a homogeneous mixture;
   (d) causing said mixture to gel by dehydration; and
   (e) sintering the gelled and dried mixture in the solid-state, between about 1050° C. and about 1150° C. to transform at least about 95% of said compound from one crystalline form to another at about 1025° C. by initiation of grain nucleation and growth, said transformed compound reaching between about 65 and 97% of theoretical density and said transformation being effected independently of growth of the nucleation particles, said transformed compound having submicron sized grains and a substantially evenly distributed pore phase.

3. The method as set forth in claim 1 which further comprises a step for adjusting the pH of said colloidal dispersions.

4. The method as set forth in claim 3, wherein said pH is adjusted to about 3.

5. The method as set forth in claim 3, wherein said pH is adjusted by addition of nitric acid.

6. The method as set forth in claims 1 and 2, wherein said oxide compound is boehmite and said nucleation particles are alpha-alumina.

7. The process as set forth in claim 6, wherein the number of particles of said alpha-alumina added to said boehmite is approximately 3% of the number of particles of said boehmite.

* * * * *

UNITED STATES PATENT AND TRADEMARK OFFICE
CERTIFICATE OF CORRECTION

PATENT NO. : 5,204,300
DATED : April 20, 1993
INVENTOR(S) : Masato Kumagai et al It is certified that error appears in the above-identified patent and that said Letters Patent is hereby corrected as shown below:

Column 5, line 21, please change "100" to --1000--.

Signed and Sealed this

Seventh Day of December, 1993

*Attest:*

BRUCE LEHMAN

*Attesting Officer*     *Commissioner of Patents and Trademarks*